US007146602B2

(12) United States Patent
Frerking et al.

(10) Patent No.: US 7,146,602 B2
(45) Date of Patent: Dec. 5, 2006

(54) BUILDER TOOL AND INTERFACE FOR SYSTEM SUPPORTING MULTIPLE VIRTUAL MACHINES

(75) Inventors: Michael J. Frerking, Marion, IA (US); David S. Hardin, Cedar Rapids, IA (US); Nick M. Mykris, Cedar Rapids, IA (US); Philip J. Wiley, Marion, IA (US)

(73) Assignee: Ajile Systems, Inc., San Jose, CA (US)

( * ) Notice: Subject to any disclaimer, the term of this patent is extended or adjusted under 35 U.S.C. 154(b) by 456 days.

(21) Appl. No.: 09/681,263

(22) Filed: Mar. 9, 2001

(65) Prior Publication Data

US 2002/0095396 A1   Jul. 18, 2002

Related U.S. Application Data

(60) Provisional application No. 60/261,925, filed on Jan. 16, 2001.

(51) Int. Cl.
*G06F 7/00* (2006.01)
*G06F 9/44* (2006.01)
*G06F 9/45* (2006.01)

(52) U.S. Cl. ............. 717/118; 717/149; 717/148; 707/1

(58) Field of Classification Search ........ 717/100–178; 718/173, 102, 100.66; 707/1–206; 711/173; 345/700–744
See application file for complete search history.

(56) References Cited

U.S. PATENT DOCUMENTS 5,062,037 A * 10/1991 Shorter et al. ............. 718/100
5,479,643 A * 12/1995 Bhaskar et al. ............ 717/124
5,673,403 A *  9/1997 Brown et al. .............. 345/744
5,692,193 A * 11/1997 Jagannathan et al. ...... 718/106
6,064,382 A *  5/2000 Diedrich et al. ........... 345/700
6,223,202 B1 *  4/2001 Bayeh ....................... 718/102
6,237,135 B1 *  5/2001 Timbol ...................... 717/107
6,247,020 B1 *  6/2001 Minard .................... 707/104.1
6,374,286 B1 *  4/2002 Gee et al. .................. 718/108
6,380,959 B1 *  4/2002 Wang et al. ............... 715/853
6,433,794 B1 *  8/2002 Beadle et al. .............. 345/700
6,513,158 B1 *  1/2003 Yogaratnam ............... 717/166
6,587,937 B1 *  7/2003 Jensen et al. .............. 711/173
6,684,390 B1 *  1/2004 Goff .......................... 717/148

OTHER PUBLICATIONS

Moss, Running Windows applications under Linux Putting Windows in its place, 2000, Linux magazine.*

* cited by examiner

*Primary Examiner*—Kakali Chaki
*Assistant Examiner*—Insun Kang
(74) *Attorney, Agent, or Firm*—Simmons, Perrine, Albright & Ellwood, P.L.C.

(57) ABSTRACT

A method and apparatus including an overview component depicting a plurality of virtual machines on a display of a computerized system. Parameter details of at least one virtual machine are concurrently displayed with the overview component. The method steps include receiving the compiled source code for two applications, creating two relocatable virtual machines to run the compiled source codes, determining the parameters for the multiple virtual machine environment, locating the two relocatable virtual machines and generating a target executable file for the environment.

22 Claims, 31 Drawing Sheets

BUILDER TOOL AND INTERFACE FOR SYSTEM SUPPORTING MULTIPLE VIRTUAL MACHINES

CROSS REFERENCE TO RELATED APPLICATION

This application claims the benefit of U.S. Provisional Application No. 60/261,925, filed Jan. 16, 2001. U.S. Provisional Application No. 60/261,925, filed Jan. 16, 2001, is hereby incorporated herein in its entirety, including all drawing figures, by this reference.

BACKGROUND OF THE INVENTION

Field of the Invention

The disclosure relates to a builder tool method and apparatus for a multiple virtual machine environment.

It is desirable in various environments and applications to utilize a computer system concurrently running multiple independent virtual machines. For example, such a system can be useful in a real-time application wherein multiple JAVA Virtual Machines (JVM) are run on a single processor. Computing systems employing virtual machines permit code to be written for a wide variety of computing systems. Code can then be written independently of host hardware or operating system considerations. Systems using virtual machines also reap security and efficiency benefits.

The multiple, concurrent virtual machine technique enables complete isolation between resources using different virtual machines. By way of further example, the multiple virtual machine technique permits a particular virtual machine to be customized to better serve the resources that have been assigned to it. In addition, a multiple virtual machine system can be efficiently ported to a multi-processor system from a single, shared processor system.

There exists a need for a system and method for creating a target executable file for a multiple virtual machine system. There exists a need for a user-friendly multiple virtual machine builder environment. There further exists a need for a system that can determine both the build information and the various project and virtual machine parameters for a multiple virtual machine environment. There also exists a need for a system that can manage allocation of resources among the various virtual machines of a multiple virtual machine environment. These needs and others are addressed and fulfilled by the present invention as disclosed in the accompanying written description and drawing figures.

SUMMARY OF THE INVENTION

The present invention involves a builder tool for an environment concurrently running multiple virtual machines. The invention is well suited for embedded environments, but can also be used in other environments. The invention is also well suited for use with JAVA virtual machines, but it can be used with other types of virtual machines as well. It can further be used to build an environment having both JAVA and non-JAVA virtual machines.

One aspect of the invention involves an algorithm for determining the project-wide and virtual machine specific parameters to be used in creating a build.

Another aspect of the invention involves an algorithm for determining allocatable resources. The builder tool also includes features to avoid conflicts when creating the build. Further, hardware pins can be configured via a graphical user interface.

Further, the invention involves a user interface designed to assist the user in developing a multiple virtual machine environment. For example, the user interface can clearly indicate to the user which virtual machine the displayed parameters and parameter fields are associated with. It also facilitates a user in readily locating a particular parameter or parameter field for a particular virtual machine. In addition, the interface assists the user in adding a new virtual machine, changing virtual machine parameters, changing or adding runtime systems and hardware configurations, changing or adding project-wide parameters, allocating and removing resources and adding or removing libraries.

The above description constitutes just a brief summary of some of the aspects of the present invention. A more complete understanding and appreciation all of the aspects of the present invention, and their equivalents, will be obtained by referring to the accompanying drawings, the detailed description and the claims.

BRIEF DESCRIPTION OF THE DRAWINGS

The invention may be more fully understood by reading the following description of the invention, in conjunction with the appended drawings wherein.

DETAILED DESCRIPTION

Several applications exist wherein it is desirable to concurrently run multiple virtual machines on a single processor. For example, some of these applications involve real-time embedded processor systems. Some other important applications involve customization of some or all of the multiple virtual machines in order to better serve the resources assigned thereto. Yet other applications have a need for complete isolation between resources using different virtual machines. Still other applications require two or more of the above-described benefits. Further, multiple virtual machine systems can have the added advantage of being efficiently ported to a multi-processor system from a single, shared processor system.

A multiple virtual machine system, including related applications, advantages and embodiments, is described in detail in U.S. patent application Ser. No. 09/056,126, filed Apr. 6, 1998, entitled "Real Time Processor Capable of Concurrently Running Multiple Independent JAVA Machines," to Gee et al. U.S. patent application Ser. No. 09/056,126, filed Apr. 6, 1998, is hereby incorporated herein in its entirety, including all drawings and any appendices, by this reference. An improved system and method for concurrently supporting multiple independent virtual machines is disclosed in U.S. patent application Ser. No. 09/681,136, filed Jan. 20, 2001, entitled "Improved System And Method For Concurrently Supporting Multiple Independent Virtual Machines," to Hardin et al. U.S. patent application Ser. No. 09/681,136, filed Jan. 20, 2001, is hereby incorporated herein in its entirety, including all drawing figures, by this reference. In addition, one type of virtual machine, the JAVA Virtual Machine, is described in detail in "The Java Virtual Machine Specification," Tim Lindholm and Frank Yellin, Addison-Wesley, Inc., (2nd ed., 1999). "The Java Virtual Machine Specification," Tim Lindholm and Frank Yellin, Addison-Wesley, Inc., (2nd ed., 1999) (ISBN 0-201-43294-3), is hereby incorporated herein in its entirety by this reference.

Figure 1:
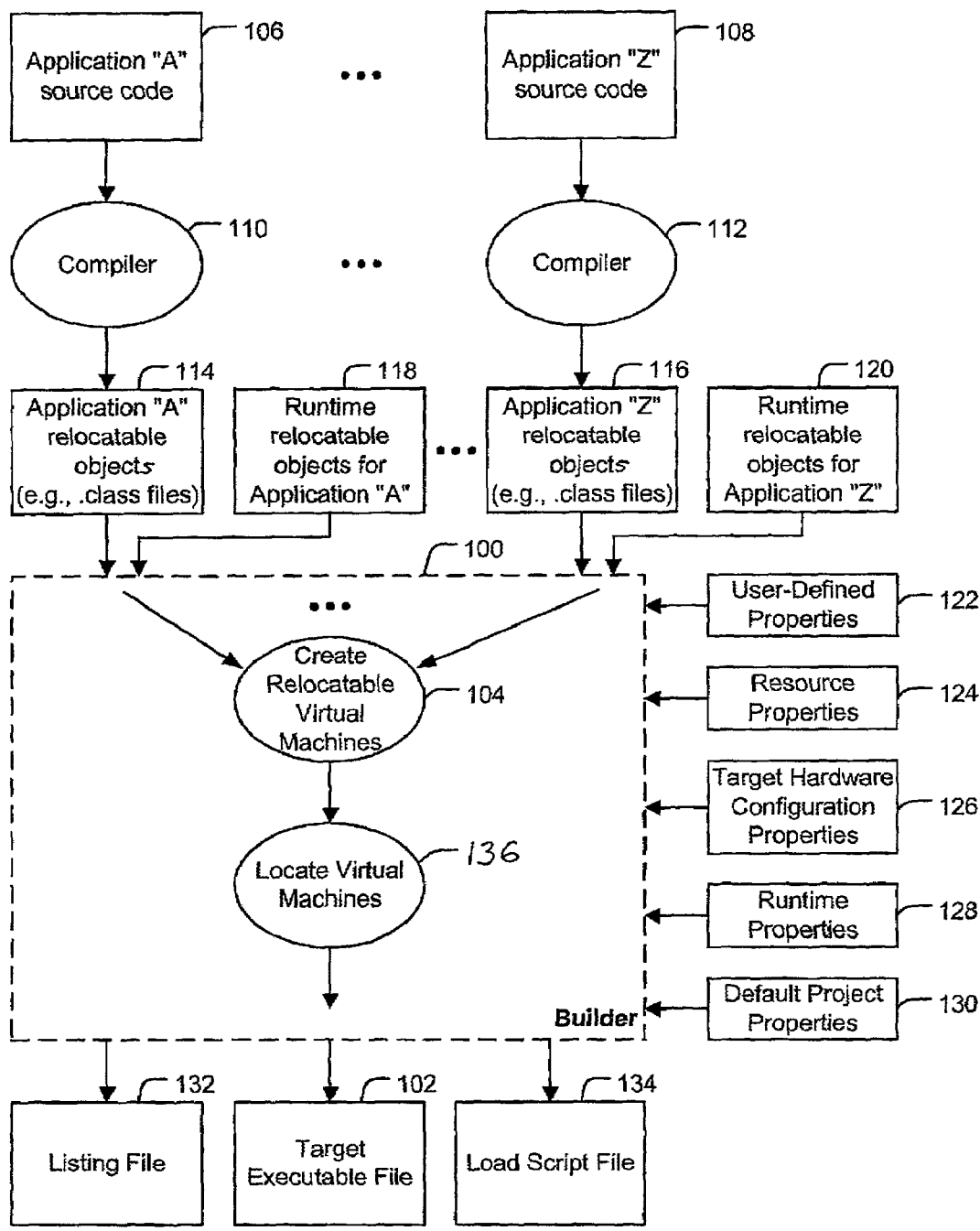
FIG. 1 is a diagram depicting various inputs to a builder tool for a multiple virtual machine environment and the resultant target executable file.

FIG. 1 is a diagram depicting the various inputs to a builder tool 100 for a multiple virtual machine environment and the resultant target executable file 102. The builder tool 100 can be programmed to create a single target executable file 102. In another embodiment, the builder tool 100 is programmed to generate multiple target executable files 102. In a related embodiment, the builder tool generates a target executable file 102 for each virtual machine. The builder tool 100 can be written in a computer language such as JAVA. Other languages, such as C, C++, Delphi, or Visual Basic can alternatively be used.

The builder tool 100 creates a plurality of virtual machines to run a plurality of applications 106, 108. The number of applications 106, 108 will vary to suit the particular needs at hand. Virtually any number of applications 106, 108 can be used with the present invention. The builder tool 100 outputs a target executable file 102 suitable for the management of multiple, concurrently running, independent virtual machines such as are disclosed in the incorporated patent applications.

Each of the plurality of applications 106, 108 is compiled 110, 112 into a set of application relocatable objects 114, 116 such as class files. Each set of application relocatable objects 114, 116 has an associated collection of runtime relocatable objects 118, 120 tailored to meet the needs of its related application. These objects can include class libraries (for example, JAVA class libraries). The builder tool 100 then creates a virtual machine 104 to run each application relocatable object 114, 116 and runtime relocatable object 118, 120 pair.

In creating the executable file 102, the builder tool 100 must determine the project parameters for the build. The builder tool 100 determines the parameters by performing a prioritized search of a variety of property data structures. In one embodiment, the properties include user-defined properties 122, resource properties 124, target hardware configuration properties 126, runtime properties 128 and default project properties 130. Embodiments of the present invention can use any subset of these properties. Other embodiments can also include other properties in addition to the above-listed properties, or in addition to any subset of the above-listed properties. The algorithm for determining the project parameters is described in further detail in relation to FIG. 2.

The user-defined properties 122 are those parameters that have been directly specified by a user. These properties include those parameters that are first entered by the user, as well as those parameters that have been first set in some other manner and are subsequently overridden by the user. In the embodiment described below in relation to FIG. 2, the user-defined properties are given the highest priority in the determination of the parameters. For example, the user-defined properties can include build directories, the application main method and file names. The user can optionally override most other build parameters.

The resource properties 124 can include various hardware resources as well as the software resources associated therewith. For example, a serial port may be allocated to a particular virtual machine. In such a case, a serial port driver is also assigned to the same virtual machine. The project parameters that load and configure the software drivers can thereby be specified. By way of further example, the resource properties can also include various numbers of serial ports, parallel ports, timers, Ethernet ports, SPI ports and other ports.

Further, if desired, a driver can also specify project parameters to add software libraries that do not require hardware. For example, a software driver can specify that a math library is loaded. If various parameters need to be specified differently as a result of loading the math library, the math library driver can specify those parameters that must or should be changed.

The target hardware configuration properties 126 can include all parameters related to the physical hardware, which can include memory sizes, processor speed, available interrupts, pin configurations, chip select timing, etc. The target hardware configuration properties 126 are the project parameters specified in the configuration data structure. The configuration data structure contains the project parameters and a list of the available resources and drivers. It is an abstraction of the target hardware configuration (the physical hardware on which the resultant program will be run).

The parameters specified in the target hardware configuration properties 126 will vary from configuration to configuration. For example, a given program might be run on one of two different computer boards, each board have a different amount of memory. In this situation, two configurations can be established. Each configuration would specify a "total memory" project parameter. The configuration related to the proper or anticipated hardware can be selected at build time. The search algorithm, such as that described in relation to FIG. 2, then automatically determines the correct memory size parameter.

The runtime is a data structure containing the project parameters. It is an abstraction of the software libraries required for a software build or link. The software libraries are the common software that can be used for more than one application. The runtime contains all parameters related to the common software libraries. The runtime properties 128 are the parameters specified in the runtime data structure.

The parameters specified in the runtime data structure will vary from runtime to runtime. For example, a system may have two (or more) software platforms, each represented as a runtime, and each requiring different amounts of protected heap memory. The amount of protected heap memory will be a parameter specified in both (or all) of the runtime data structures. The search algorithm, such as that described in relation to FIG. 2, can then automatically determine the correct protected heap memory size parameter by searching the selected runtime.

The default project properties 130 are a set of those parameters that will be used by the builder if none of the other available sources (such as the four above-described property types 122, 124, 126, 128) specify a needed parameter or parameters. Once a parameter is returned, the search for that parameter ceases. If the parameter is not found, however, the algorithm reaches the default properties and the default parameter is returned. The default project properties 130 can include parameters that may be specified by the other above-described property types as well as hardware independent properties. Hardware independent properties are properties that are not directly related to the hardware and are therefore not tied to the choice of hardware. For example, the hardware-independent project properties can include user preferences, properties associated with the runtimes, and project default data, etc.

The builder tool 100 can create a target executable file, as described above, and a related list file 132 and load script file 134. The list file 132 is a collection of status and debug output files generated by the builder tool 100. Builder tool parameters can be used to specify the amount of information contained in a list file 132. The load script file 134 is used by the downloader program to send the target executable file 102 to the target board.

Figure 2:
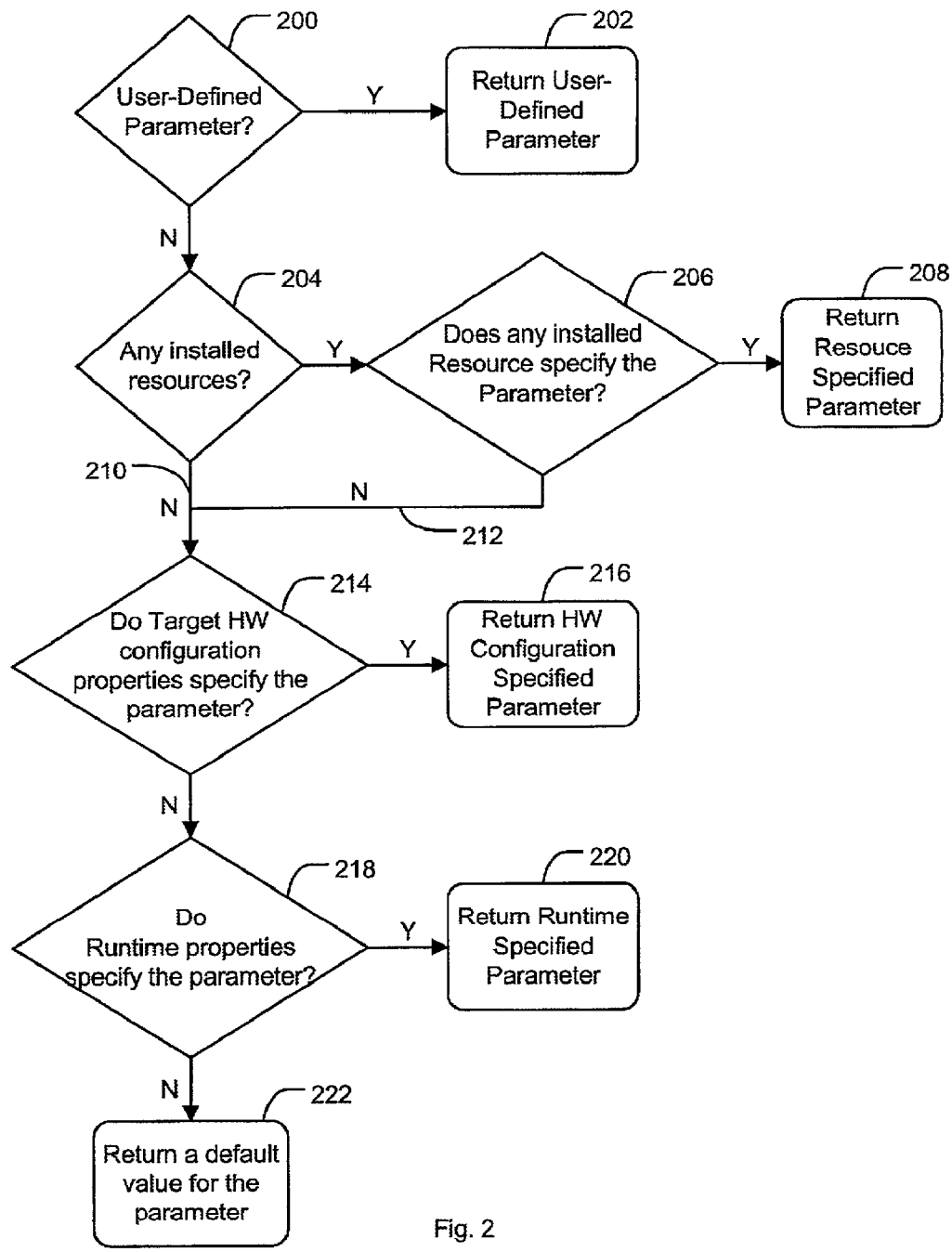
FIG. 2 is a flowchart depicting an algorithm for determining project parameters for a build.

When a software build occurs, the project parameters are determined and passed to a linking and/or locating tool 136. Examples of such tools include the GNU relocating linker, the slinker, as well as any of a variety of other proprietary tool sets. An algorithm for determining project parameters, described in detail below in connection with FIG. 2, is used to compute all project parameters. Each project parameter is then passed to the build tool and it is executed.

FIG. 2 is a flowchart depicting an algorithm that can be used by the builder tool 100 in determining the project parameters to be used in a build such as is depicted in FIG. 1. This algorithm can also be used when determining the project parameters to be displayed via the various user interface screens described below. The algorithm of FIG. 2 presents but one embodiment that may be used. For example, it will be appreciated that the priority level of the various types of properties can be altered in related embodiments. Further, the types of the priorities can be changed in different embodiments. For example, other embodiments may search just a subset of the property types presented in FIGS. 1 and 2. By way of further example, other embodiments may include other properties in addition to the described properties (or in addition to a subset of the described properties types).

A data structure is used for each level of project data. In the context of FIGS. 1 and 2 for example, one data structure is used to hold the default property data, another data structure is used to hold the runtime property data, another data structure is used to hold the target hardware configuration properties data, another data structure is used to hold the resource property data and yet another data structure is used to hold the user-defined or user-overwritten property data. Various data structures can be used for these purposes. For example, language data structures, directories, files, databases or other types of data structure can be used.

The algorithm of FIG. 2 is repeated for each parameter needed for display or for a build. The following text will step through the algorithm for a single parameter. A project build will repeat the algorithm for each parameter needed for the build. Similarly, a search for display purposes will repeat the algorithm for each parameter to be displayed via the user interface.

First, the data structure holding the user-defined properties is searched to determine whether the needed parameter has been specified by the user 200. If it has been so specified, the user-defined parameter data is returned 202. If the data structure holding the user-defined properties does not specify the needed parameter, then it is determined whether any resources have been installed 204. If one or more resources have been installed, the data structure holding the resource properties is searched to determine whether the installation of any resources has cased the parameter to be specified 206. If it has been so specified, the resource-defined parameter data is returned 208.

If it is determined that no resources have been installed 210 or that none of the installed resources have specified the needed parameter 212, the data structure holding the target hardware configuration properties is searched to determine whether the needed parameter has been specified 214. If it has been specified therein, the target hardware configuration parameter data is returned 216. Otherwise, the data structure holding the runtime properties is searched to determine whether the needed parameter has been specified as a consequence of the selection of the runtime system 218. If it has been specified therein, the runtime-defined parameter data is returned 220. Finally, if none of the prior searched data structures has specified the parameter, then a default parameter is returned from the data structure holding the collection of default parameter data 222.

Figure 3:
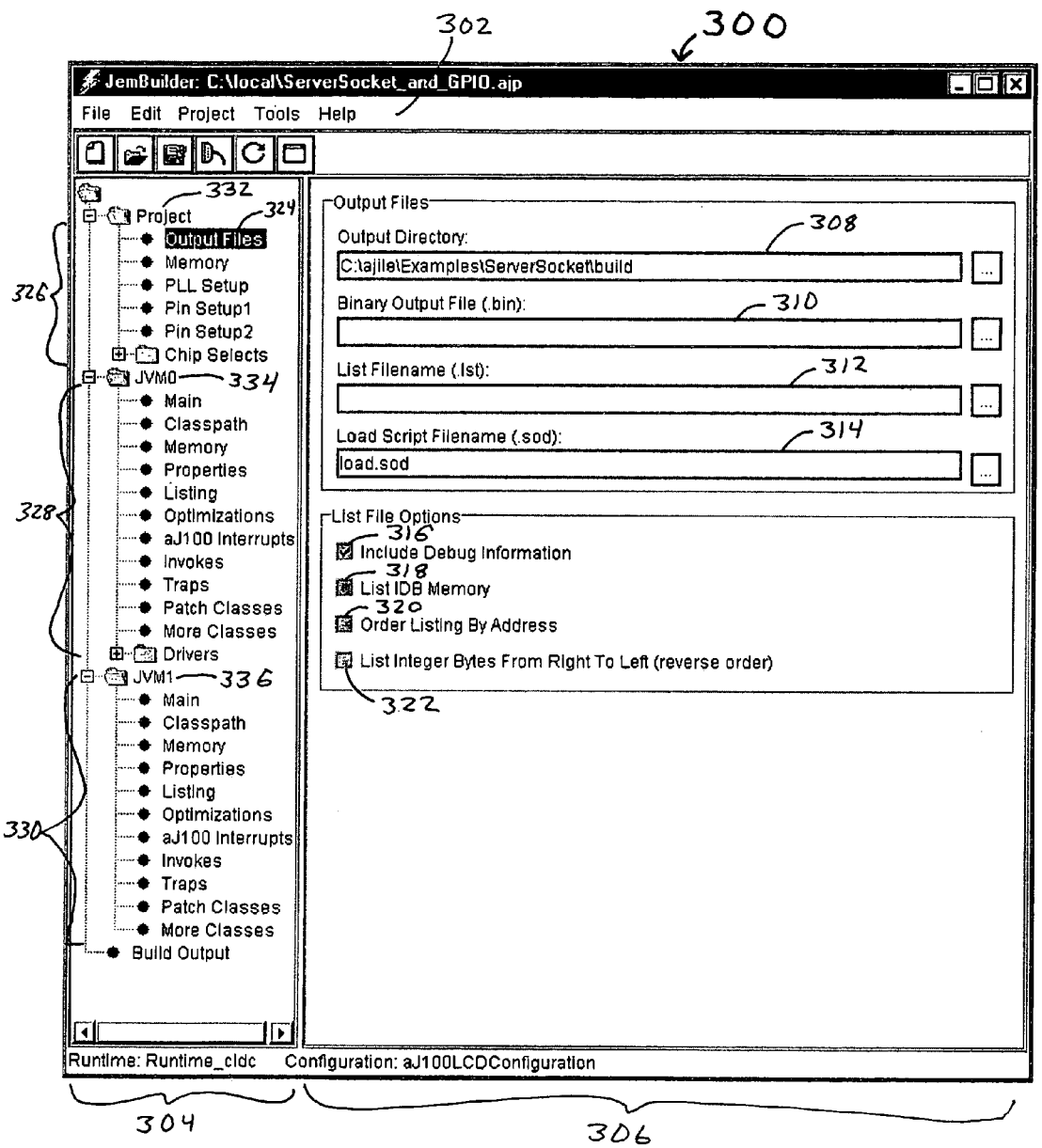
FIG. 3 depicts a screen of a user interface for a builder tool for a multiple virtual machine environment, the screen showing a system overview structure and a variety of output file parameter fields.

FIG. 3 depicts a screen 300 of a user interface for a builder tool for a multiple virtual machine environment. It will be readily appreciated that the code for the disclosed builder can be run on any of a wide variety of computing apparatuses having a wide variety of different sizes and types of visual displays. The screens discussed throughout this specification are shown to the user via a visual display component of an appropriately configured computing apparatus. The screen 300 includes a bar of menus 302, a system overview structure 304 and a parameter view structure 306. In FIG. 3, the parameter view structure 306 portion of the screen 300 displays a plurality of parameter fields 308, 310, 312, 314, 316, 318, 320, 322 related to, in this case, the selected Project Output Files 324 designation in the system overview structure 304.

When the algorithm of FIG. 2 is used to display parameters related to the various project choices 326 in the parameter view structure 306, each virtual machine must be searched for the parameter or parameters to be displayed. Each virtual machine of the system is checked, one-by-one, for any installed resources 204. If there are one or more installed resources, the data structure is searched 206 and the appropriate parameter data, if any, is returned 208. The data structure holding the target hardware configuration properties is searched 214 only after each of the virtual machines have been checked.

When the algorithm of FIG. 2 is used to display parameters related to one of the various virtual machines 328 or 330 in the parameter view structure 306, a slightly different procedure is followed. Only the data structure holding the resource property parameter data for the related virtual machine need be searched when proceeding through the resource property related steps 204, 206, 208. For example, when searching for a parameter to be displayed in a parameter view structure 306 related to the first listed virtual machine 328, the resource property related steps 206, 208, which govern the search of any resource specified parameters, are only performed if the first listed virtual machine 328 has had any resources installed. None of the other existing virtual machines, such as the second listed virtual machine 330, are searched.

The system overview structure 304 of the example presented in FIG. 3 includes the concurrent display of one group of project choices 326 and two virtual machines. It will be appreciated, however, that the number of virtual machines used in a system, and hence the number of virtual machines displayed in the system overview structure 304, will vary from application to application. Virtually any number of virtual machines can be displayed via the system overview structure 304. Two virtual machines 328, 330 are displayed in FIG. 3 for illustrative purposes only. The number of virtual machines is not intended to be a limiting feature of the invention.

Further, although the system overview structure 304 of FIG. 3 is shown as depicting the group of project choices 326 concurrently with the virtual machines, other embodiments of the invention will not display the "Project" heading 332 or any of the project choices 326 concurrently with any of the virtual machines. Thus, some embodiments will only display the virtual machine information 328, 330 in the system overview structure 304. In such embodiments, the project heading 332 and project choices 326 can be called up separately by the user via use of a pull-down menu and selection technique or via any of a variety of other such techniques.

In FIG. 3, the system overview structure 304 is depicted as a tree structure. In such structures each of the headings 332, 334, 336 can be collapsed or expanded as needed by selecting the appropriate heading 332, 334, 336. One significant advantage of the present invention, however, is the ability to concurrently display various parameters in the parameter view structure 306 while concurrently displaying the virtual machine 328, 330 related thereto via the system overview structure 304. This ensures the user that he or she is entering and viewing parameters related to correct virtual machine. In addition, the concurrent display of two or more virtual machines in the system overview structure 304, permits a user to easily move about the various parameters of the system when creating or modifying the system.

Other types of structures can be used to achieve the same results as the tree structure. For example, the system overview structure 304 can alternatively be a tab structure wherein "file folder" type tabs, labeled with the names of the existing virtual machines, appear across a portion of the screen. The tab for the virtual machine currently being displayed can be indicated by a different coloring, layering or other type of scheme. A second type of tab can be used to indicate each of the various parameter groups related to a particular virtual machine.

In yet another embodiment, a "main-menu"/"sub-menu" scheme can be used. In this embodiment the system overview structure 304 is an appropriate number of pull-down menus located, for example, in the bar of menus 302 across the upper portion of the screen 300. The captions appearing in the bar of menus can include the names of the virtual machines of the system. When selected, each virtual machine pull-down menu displays its related set of parameter groups (such as those groups shown in FIG. 3, 328, 330). Thus, this embodiment can also concurrently display an overview of a virtual machine and one or more parameters related to that virtual machine. In a related embodiment, the bar of menus 302 can also include a pull-down "Project" menu that displays choices such as the project choices 326 of FIG. 3 when selected.

Figure 4:
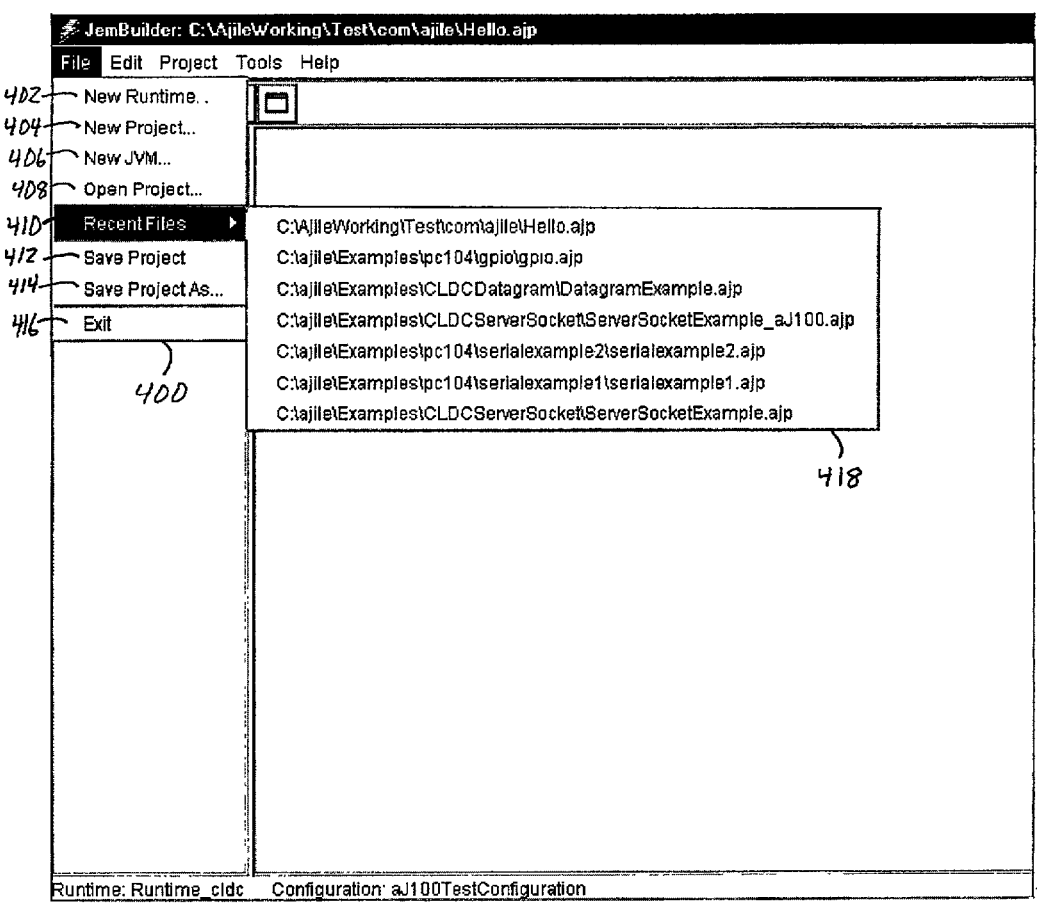
FIG. 4 depicts a file menu of options related to one embodiment of the present invention.

FIG. 4 depicts a pull-down file menu 400 of options related to one embodiment of the present invention. The file menu 400 is associated with a group of options or sub-menus 402, 404, 406, 408, 410, 412, 414, 416. As shown, the "Recent Files" sub-menu 410 displays another group of options 418 when selected. Other options 402, 404, 406, 408, 414 of the file menu 400 will also cause additional information, screens or choices when selected. The operation and creation of such menus is well known.

Figure 5:
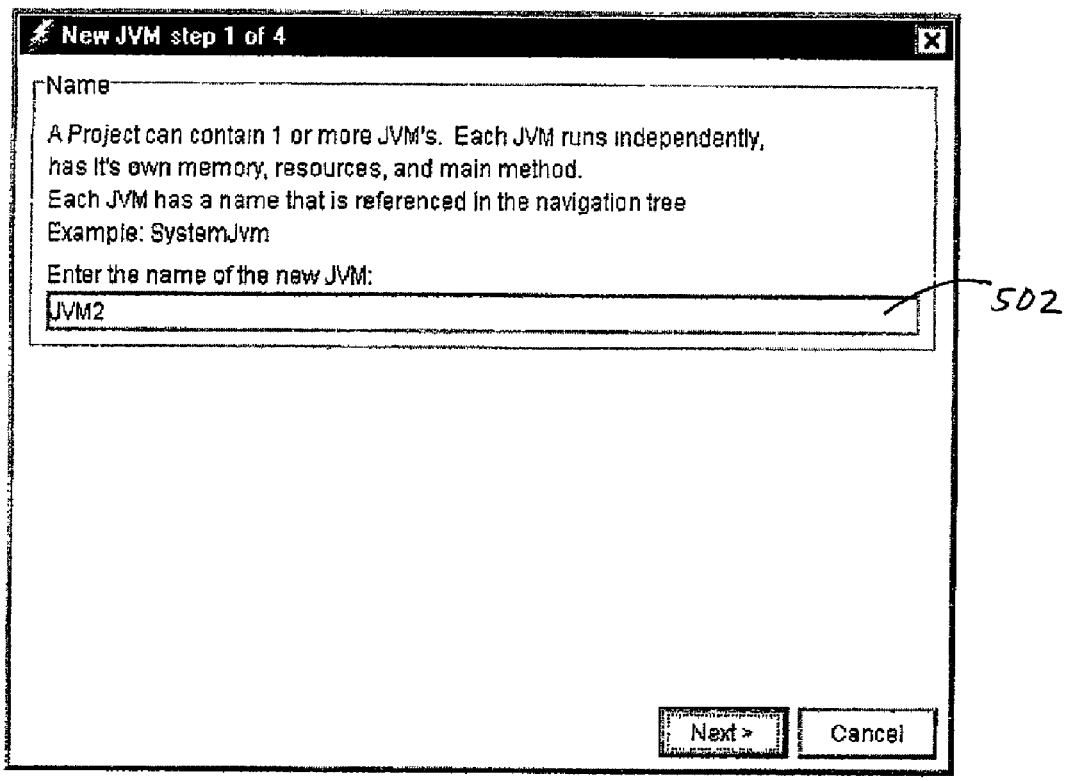
FIG. 5 depicts a builder tool input screen for naming a new virtual machine being added to a multiple virtual machine environment.

FIG. 5 depicts a builder tool input screen 500 for naming a new virtual machine being added to a multiple virtual machine environment. This input screen 500 can be displayed, for example, by selecting the "New JVM" 406, FIG. 4, sub-menu of the file menu 400, FIG. 4. In this embodiment of the invention, selecting the "New IVM" sub-menu 406 calls up a multi-screen sequence that prompts a user for the information required to create the new virtual machine (in this example, a new JAVA virtual machine).

Although the embodiment disclosed via FIGS. 5–8 is an ordered sequence of four separate screens that each require entry of the requested information before presenting the next screen to the user, other embodiments can also be implemented. For example, all of the text and fields displayed on the four screens could alternatively be presented on just one, two or three screens. By way of further example, other embodiments may request or present more information and may have more than four screens. Many variations are possible.

Figure 6:
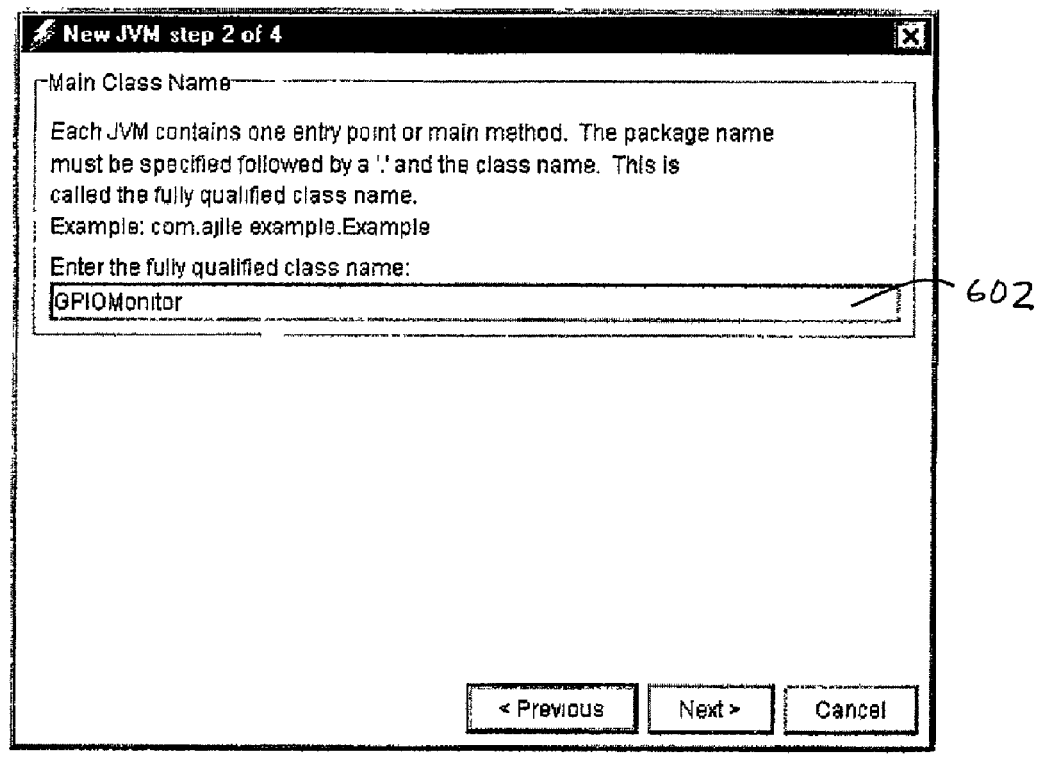
FIG. 6 depicts a builder tool input screen for entering a main class name for a new virtual machine being added to a multiple virtual machine environment.

FIG. 6 depicts an embodiment of the screen 600 that is presented to the user after a virtual machine name has been properly entered into the name parameter field 502, FIG. 5. This screen 600 prompts the user to enter a class name for the main method to be associated with the new virtual machine. In the example of FIG. 6, the user has entered a main class name into the main class name parameter field 602.

Figure 7:
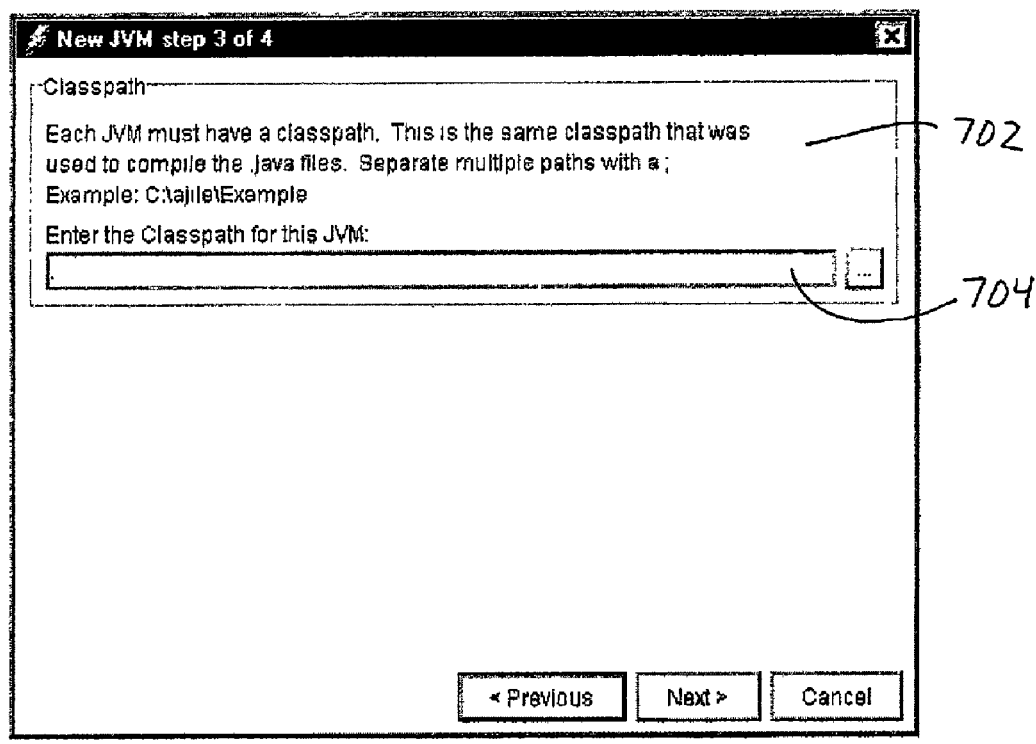
FIG. 7 depicts a builder tool input screen for indicating a classpath for a new virtual machine being added to a multiple virtual machine environment.

FIG. 7 depicts the next input screen 700 of the sequence. This screen 700 prompts the user to enter the classpath to be used for the new virtue machine. As with the other screens 500, 600, this screen 700 also contains an explanation of the type of information being requested 702. The screen 700 also includes a classpath parameter entry field 704 wherein the user will enter the requested information.

Figure 8:
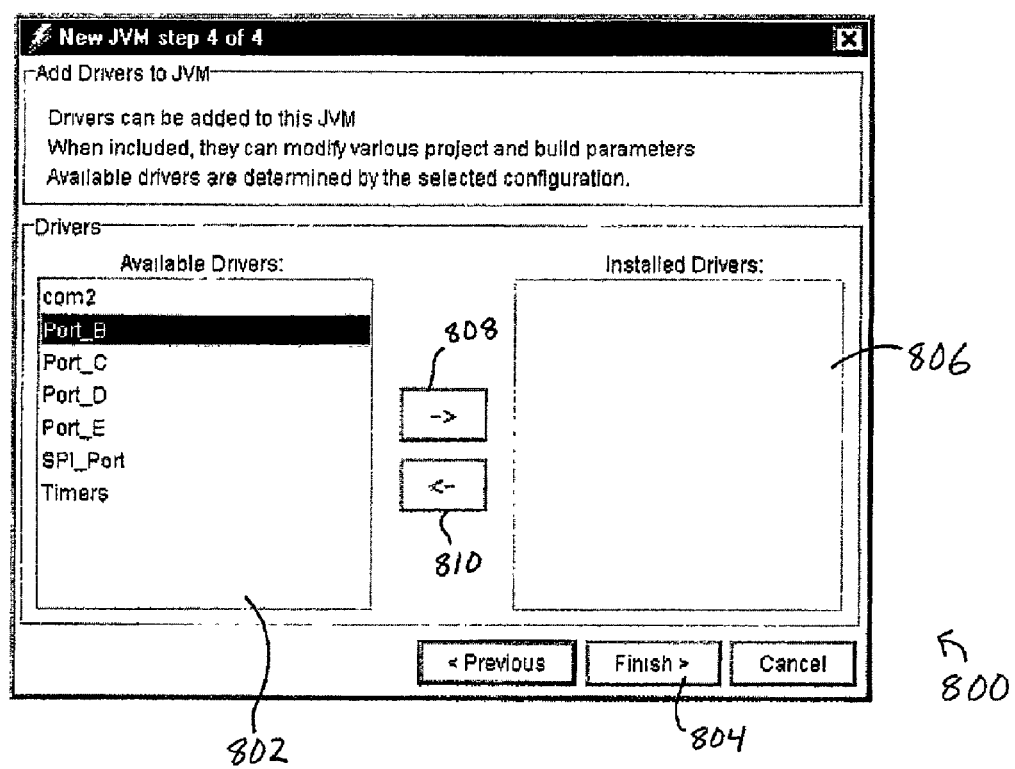
FIG. 8 depicts a builder tool input screen for designating resources, such as a driver, for a new virtual machine being added to a multiple virtual machine environment.

FIG. 8 depicts the last screen 800 of the sequence. This screen permits the user to allocate one or more of the available resources 802, such as a driver, to a new virtual machine. The user is not required to allocate a resource, however. It possible, by selecting the "Finish" button 804, to create the new virtual machine without allocating any of the available resources. As disclosed above in greater detail, allocation of a resource can cause various other project and build parameters to be automatically modified. All parameter modifications, however, are dynamically updated in real time throughout the many components and screens of the builder tool.

To allocate a resource, a user can select the desired available resource in the list of available resources 802 and drag it to the installation panel 806 or click on the installation arrow 808. To remove an allocated resource and thereby make it an available resource, the user can select the desired allocated resource in the list of allocated resources 806 and drag it to the list of available resource 802 or click on the removal arrow 810. When finished with the resource screen 800, the new virtual machine is created by selecting the finish button 804. Upon creation, a representation of the new virtual machine is immediately and automatically added to the system overview structure 304, FIG. 3, and the user is returned to the screen that was displayed when the New JVM sub-menu was selected. In addition, any affected parameters, as a result of an allocation or a removal of a resource for example, are immediately and automatically updated.

Figure 9:
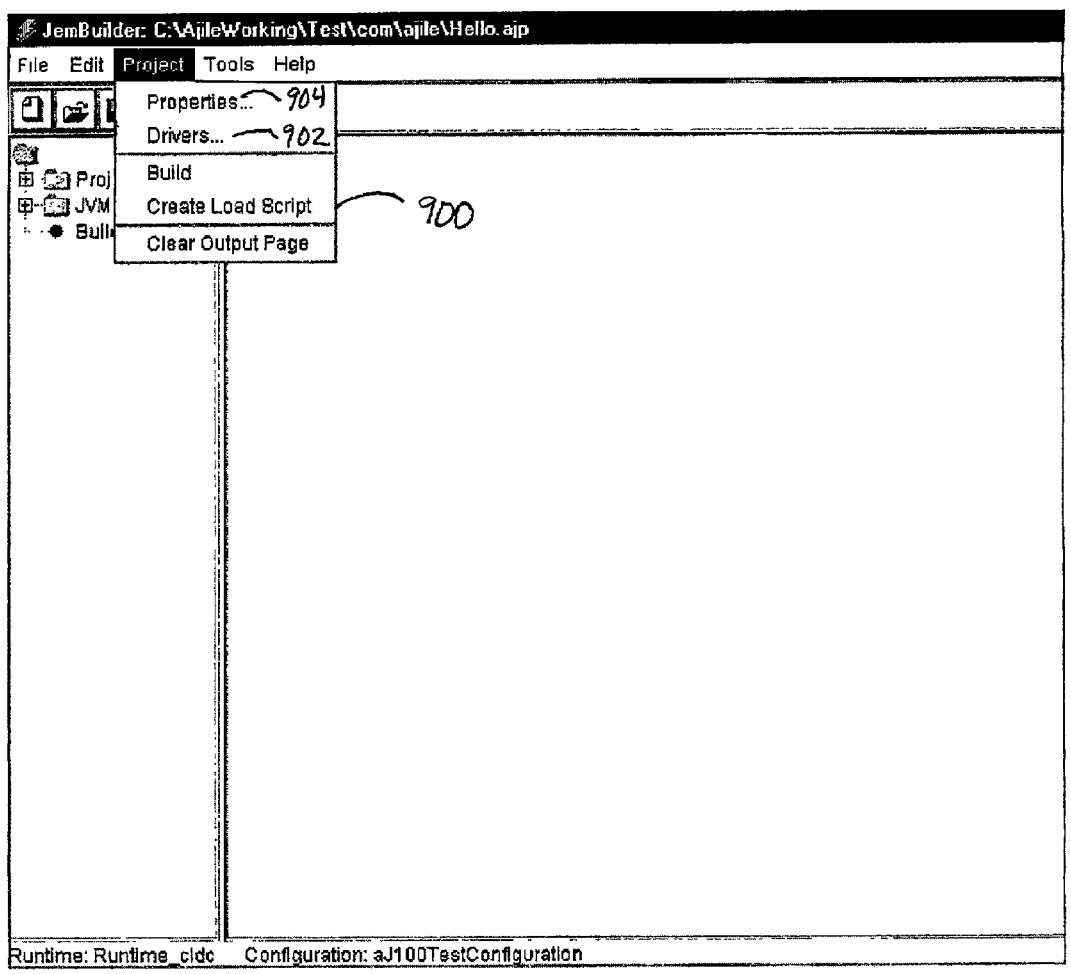
FIG. 9 depicts a project menu of options related to one embodiment of the present invention.
Figure 10:
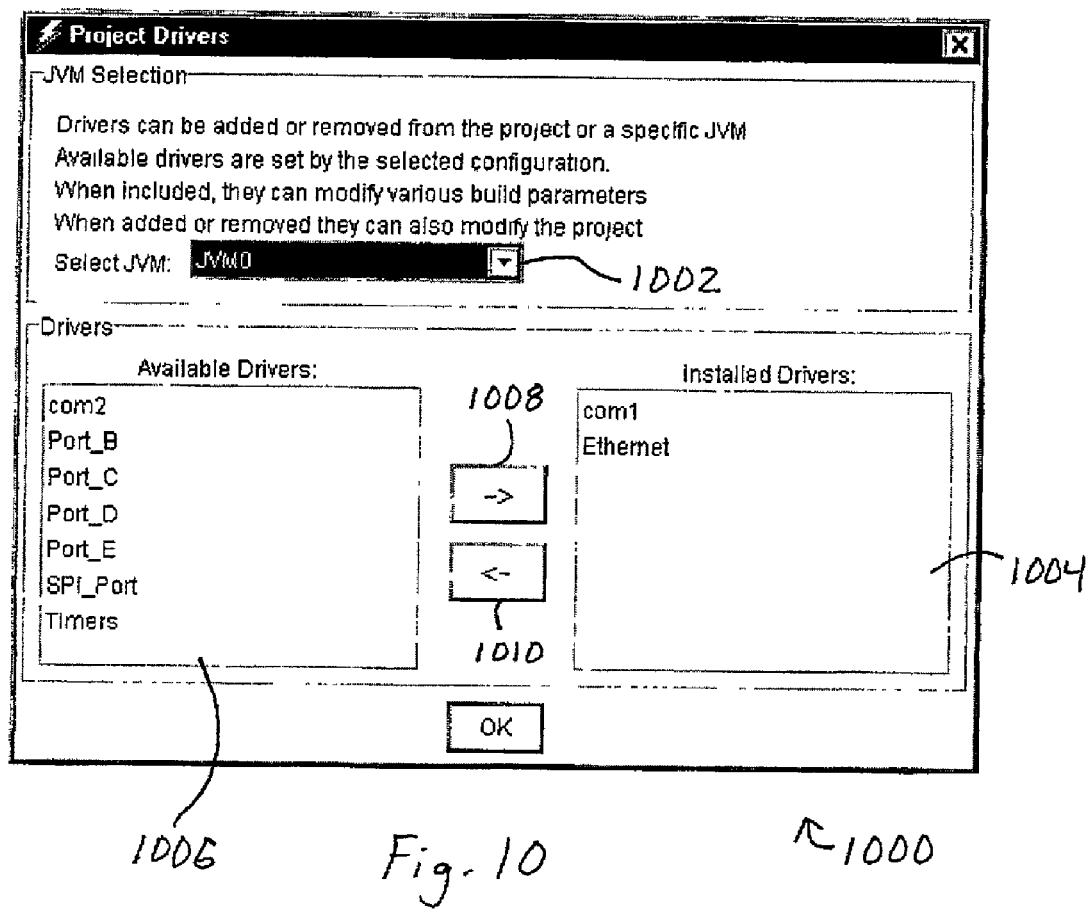
FIG. 10 depicts a builder tool input screen for designating resources for an existing virtual machine in a multiple virtual machine environment.

FIG. 9 depicts a project menu 900 of options related to one embodiment of the present invention. FIG. 10 depicts a builder tool resource screen 1000 that is displayed when the "Drivers" sub-menu 902, FIG. 9, is selected. The resource screen 1000 is very similar in structure and operation to the resource screen 800 of FIG. 8. The main difference is that the resource screen of FIG. 10 is used to modify an already existing virtual machine, whereas the resource screen of FIG. 8 is used only when creating a new virtual machine. As a result, the resource screen 1000 of FIG. 10 includes a virtual machine selection field 1002 that permits the user to select which of the existing virtual machines he or she wishes to modify or examine. Upon selecting a virtual machine via the selection field menu 1002, the resources allocated thereto are displayed in the allocated resources panel 1004 and the resources available to that virtual machine are displayed in the list of available resources 1006. The user can then make the desired modifications using the installation 1008 and removal 1010 buttons.

Figure 11:
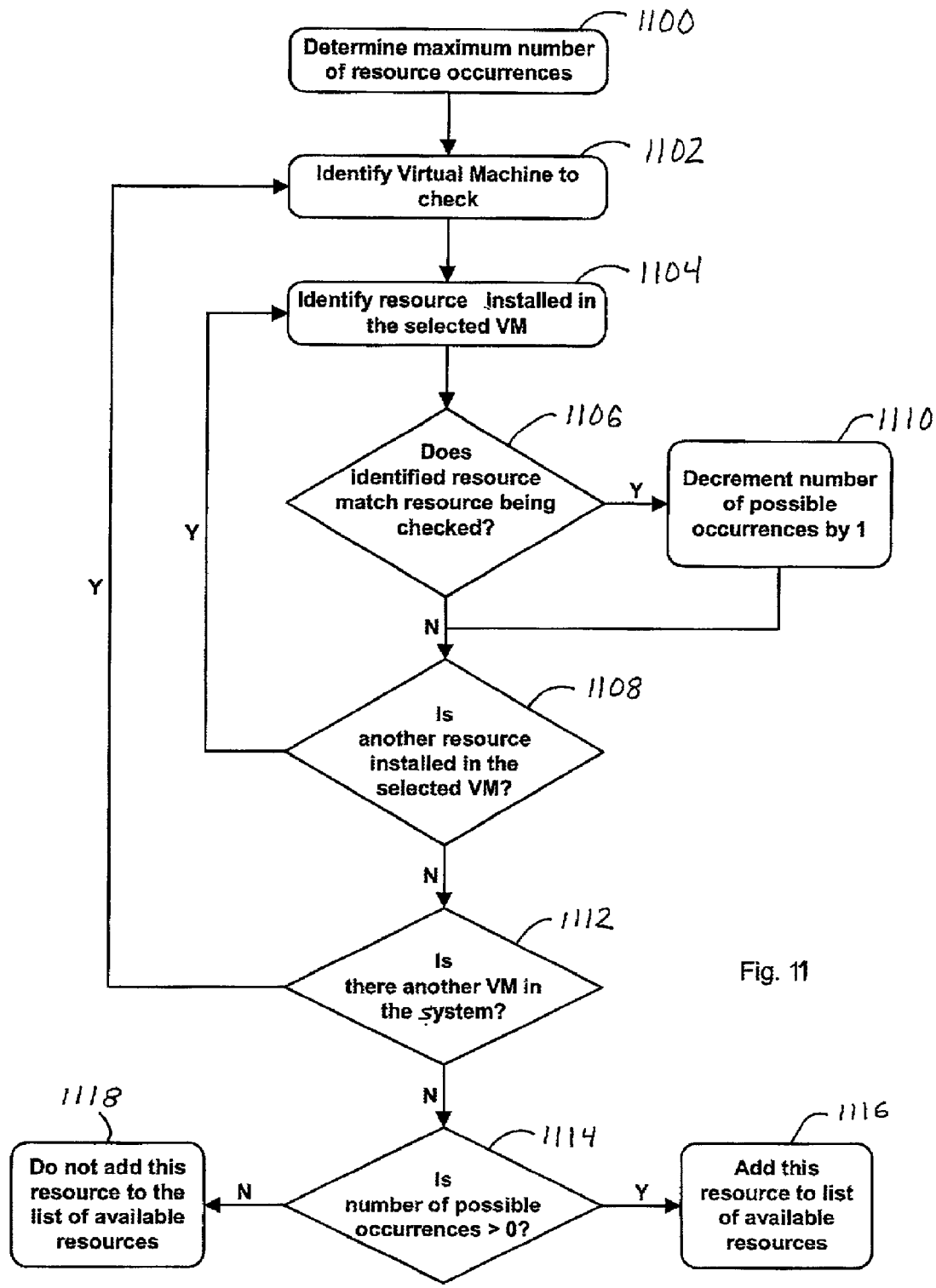
FIG. 11 is a flowchart depicting an algorithm for determining resources available to be allocated to a virtual machine in a multiple virtual machine environment.

FIG. 11 is a flowchart depicting an algorithm for determining resources available to be allocated. The algorithm can be used to determine a list of resources available to be allocated to a selected virtual machine. For example, the list of available resources 802, 1006 presented to the user in the screens of FIGS. 8 and 10 can be generated via the application of this algorithm. Other types of user interface can also be used to facilitate allocation and removal of drivers for a given virtual machine.

Use of this algorithm will ensure that a hardware resource will not be allocated more times than it exists on the target hardware. A serial port, for example, requires specific hardware on the target platform and is represented by a software driver. If only one serial port exists, the algorithm ensures that its software driver will be assigned to only one virtual machine. If two such resources exist, no more than two software drivers can be assigned. If desired, the two serial ports could be assigned to the same virtual machine, but no more than two drivers can be assigned. Whenever a resource has been allocated or removed from a virtual machine, the algorithm can be executed again to compute a new available driver list.

Software drivers are assigned to a virtual machine by adding a reference to the driver to a data structure contained in the virtual machine project data. In addition, the target hardware configuration list contains a list of all available drivers and the number of occurrences of each driver. Consequently, the list of possible drivers can change dynamically as the target configuration is changed.

The algorithm of FIG. 11 is repeated once for each resource known or believed to exist in the system. First, the maximum possible number of occurrences of the particular resource is determined 1100. Second, a virtual machine from the collection of existing virtual machines is selected 1102. Third, at least one of the resources allocated to the selected virtual machine is identified 1104. Next, it is determined whether the identified installed resource is the same type as the resource being checked 1106. If they are not of the same type, the selected virtual machine is checked for another installed resource 1108. If they are of the same type, the number of possible occurrences, originally determined in the first step 1100, is decremented by one 1110 and the selected virtual machine is checked for another installed resource 1108. If there is another installed resource, that resource is identified 1104 and the loop repeats until all of the installed resources have been checked.

At this point it is determined whether an unchecked virtual machine exists in the system 1112. Control also passes to this step 1112 whenever it is determined that no resources have been allocated to the virtual machine being checked (for example, control passes from the resource identification step 1104 to the check for an additional unchecked virtual machine 1112 when the virtual machine being checked has no allocated resources). The algorithm continues to loop back from the unchecked virtual machine step 112 to the virtual machine identification step 1102 until all of the virtual machines in the system have been checked. At this point the calculated number of remaining resources of the given resource type is checked 1114. If the number of remaining occurrences is greater than zero, the given resource type is added to the list of available resources 1116. If desired, an indication of the remaining number of the available type can also be presented to the user. This can be done, for example, by displaying the number available next to the name of the resource type or by placing the appropriate number of the given resource type into the available resource list. Finally, if the number of remaining occurrences of the resource type is not greater than zero, then the resource type is not added to the list of available resources 1118. As noted, the entire algorithm is repeated for each of the resource types present in the system.

Figure 12:
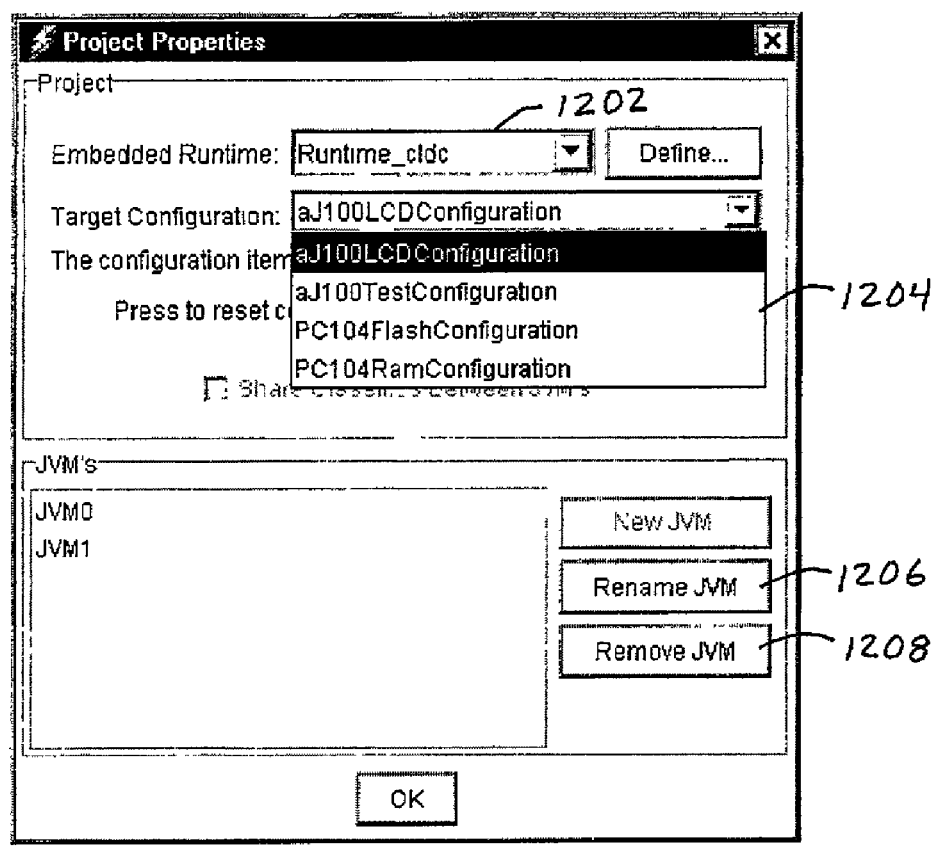
FIG. 12 depicts a builder tool input screen for selecting project-wide parameters for a multiple virtual machine environment.

FIG. 12 depicts a builder tool input screen 1200 for selecting project-wide parameters for a multiple virtual machine environment. The screen 1200 enables the user to select a runtime 1202 and a target configuration 1204. The runtime and target configurations are pre-existing constructs for the various runtimes and hardware configurations that are available to the system. The user can also rename 1206 or remove 1208 existing virtual machines. This screen 1200 can be accessed via the properties sub-menu 904, FIG. 9.

Figure 13:
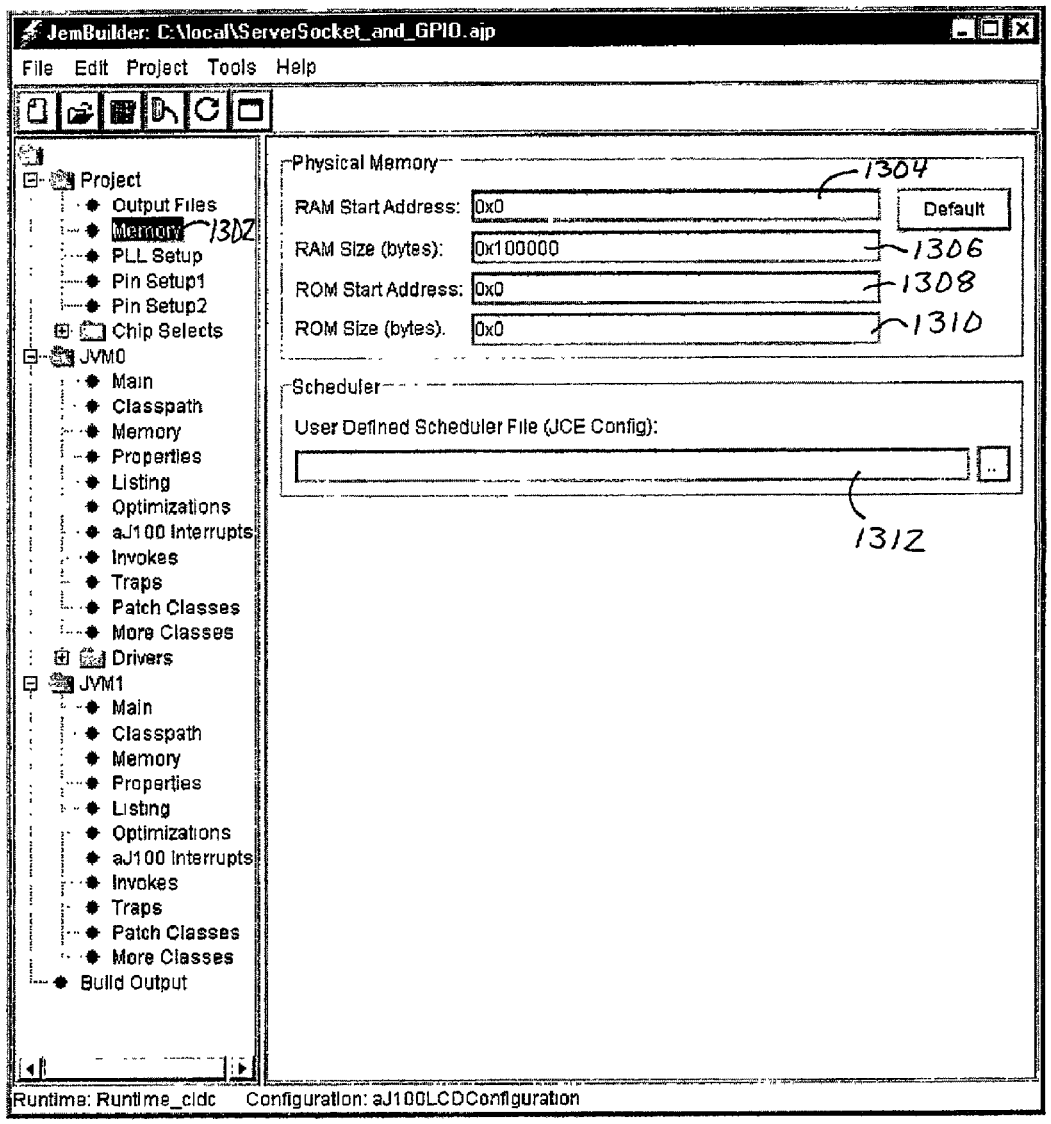
FIG. 13 depicts a screen of a user interface for a builder tool for a multiple virtual machine environment, the screen showing a system overview structure and a variety of memory parameter fields.

FIG. 13 depicts a screen 1300 displaying project memory 1302 parameter fields 1304, 1306, 1308, 1310. The general structure and operation of this screen 1300 has been previously described in relation to FIG. 3. The purpose of each of the parameter fields 1304, 1306, 1308, 1310 is documented by the text accompanying each field and will not be described further here.

Figure 14:
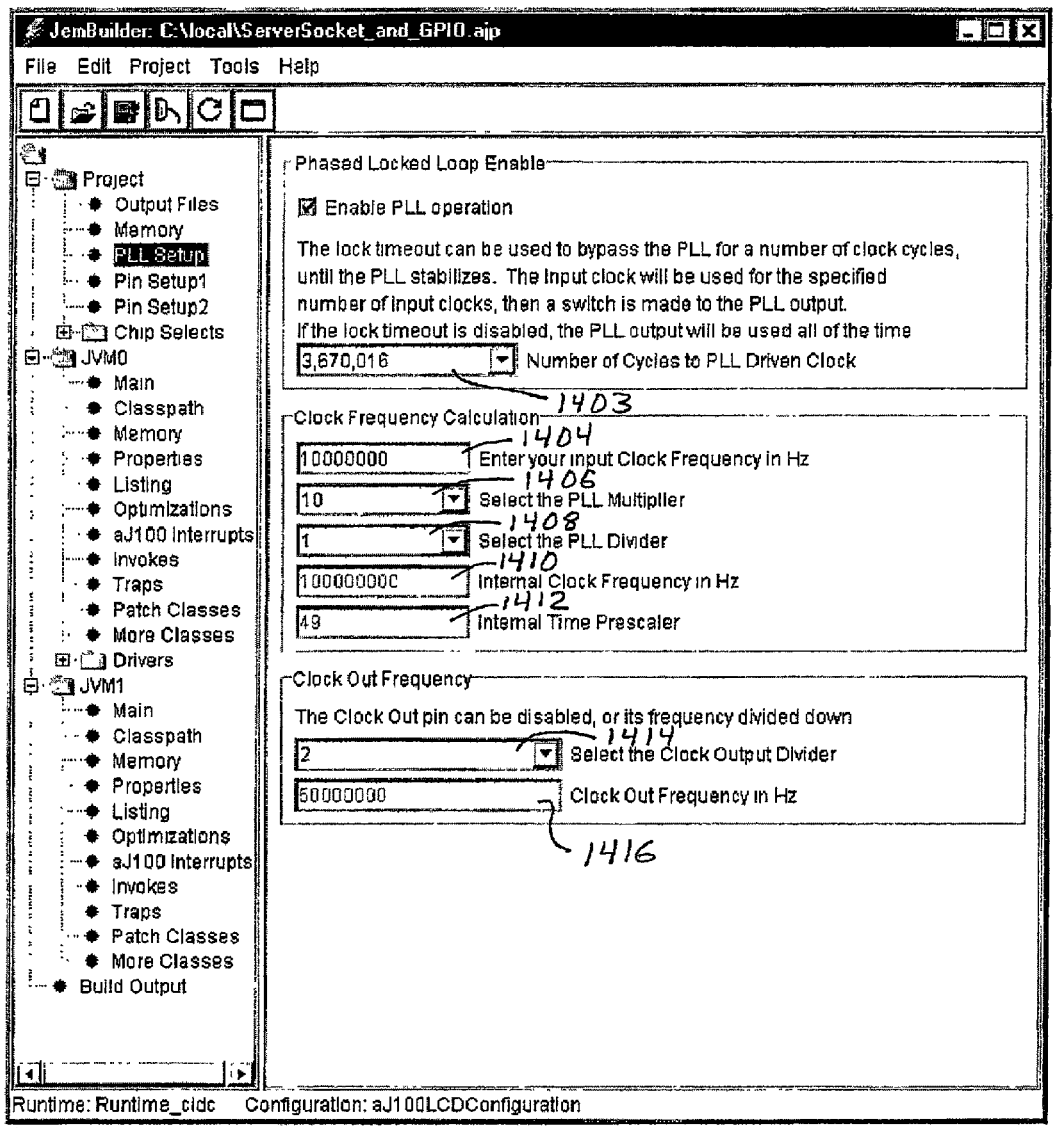
FIG. 14 depicts a screen of a user interface for a builder tool for a multiple virtual machine environment, the screen showing a system overview structure and a variety of phase lock loop set-up parameter fields.

FIG. 14 depicts a screen 1400 displaying a system overview structure 1402 and a variety of phase lock loop set-up parameter fields. The purpose of each of the parameter fields 1403, 1404, 1406, 1408, 1410, 1412, 1414, 1416 is documented by the text accompanying each field and will not be described further here.

Figure 15:
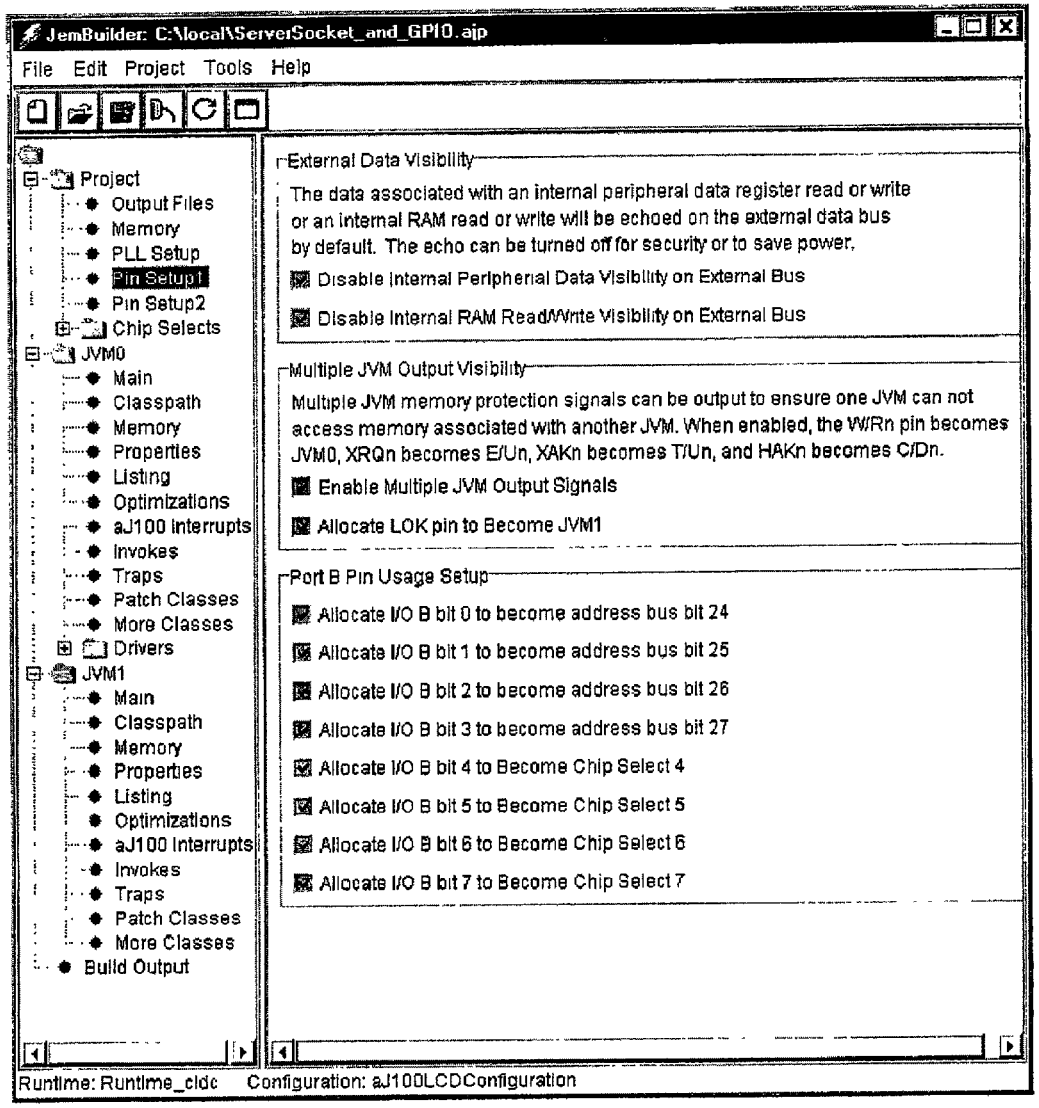
FIG. 15 depicts a screen of a user interface for a builder tool for a multiple virtual machine environment, the screen showing a system overview structure and a variety of pin set-up parameter fields.
Figure 16:
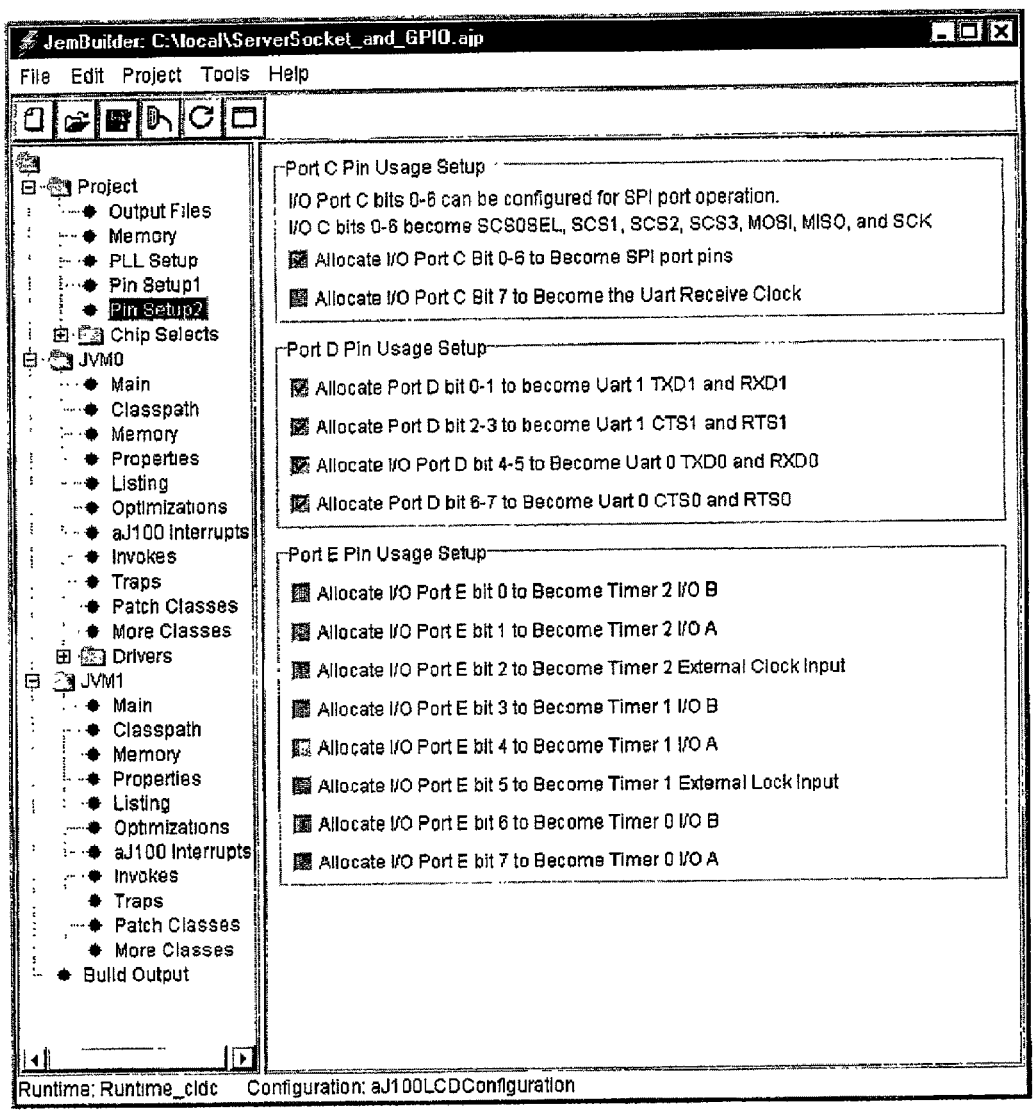
FIG. 16 depicts a screen of a user interface for a builder tool for a multiple virtual machine environment, the screen showing a system overview structure and a variety of additional pin set-up parameter fields.

FIGS. 15 and 16 depict screens displaying a variety of pin set-up parameter fields. Again, to one with ordinary skill in the art, the purpose of each of the parameter fields 1304, 1306, 1308, 1310 is documented by the text accompanying each field and will not be described further here. It will be appreciated, however, that the ability to configure the various pins via a graphical user interface is a unique and useful aspect of the present invention.

Figure 17:
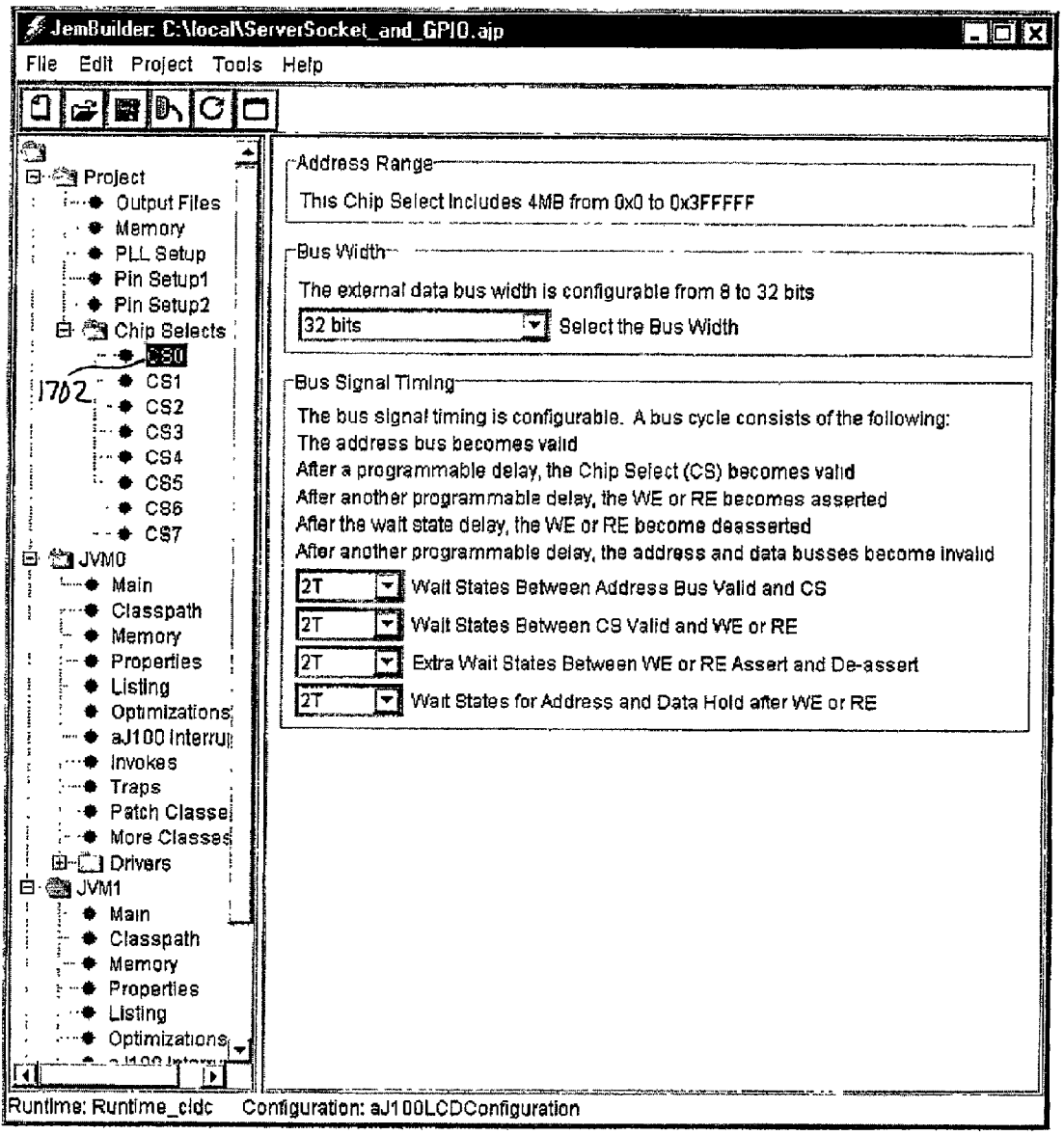
FIG. 17 depicts a screen of a user interface for a builder tool for a multiple virtual machine environment, the screen showing a system overview structure and a variety of chip select parameter fields.

FIG. 17 depicts a screen 1700 displaying the parameter fields related to one of the variety of project chip select options 1702. The purpose of each of the parameter fields is documented by the text accompanying each field and will not be described further here.

FIGS. 18 through 30 depict the various groups of parameter fields associated with one of the virtual machines of the system. The depicted groups of fields, or a subset of such groups, will be associated with each virtual machine of the system. Other embodiments of the invention may have a greater or a lesser number of parameter groups associated with a virtual machine. The number, organization or types of the parameter fields and parameter groups displayed and discussed herein is not intended to limit the scope of the invention. Many variations and embodiments are possible and are within the scope of the invention.

The purpose and operation of the parameters and parameter fields displayed throughout FIGS. 18 through 30 is documented by the text accompanying each field and, with the following exceptions, will not be described further here. Further, it will be appreciated that the exact parameters used in the various parameter fields discussed throughout this disclosure are generally application specific. For example, their nature and type can be a consequence of the particular locating tool being used. Thus, the actual parameters used will vary depending upon the particulars of the build tool and hardware (such as pin fields and many other such hardware related elements as needed by the build tool) used.

Figure 18:
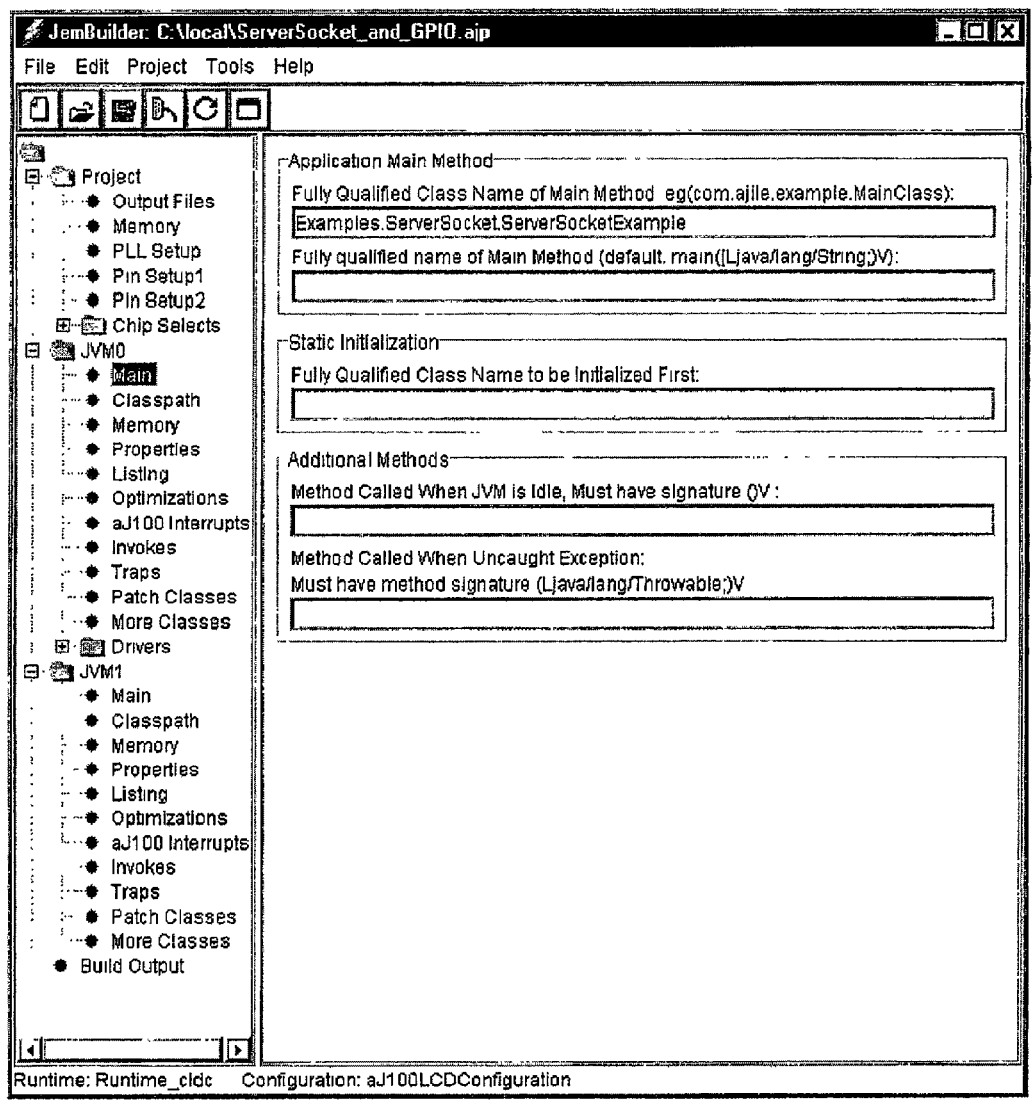
FIG. 18 depicts a screen of a user interface for a builder tool for a multiple virtual machine environment, the screen showing a system overview structure and a variety of parameter fields related to a first virtual machine including the user main method.

FIG. 18 depicts a screen displaying a variety of parameter fields related to the first virtual machine including the user main method.

Figure 19:
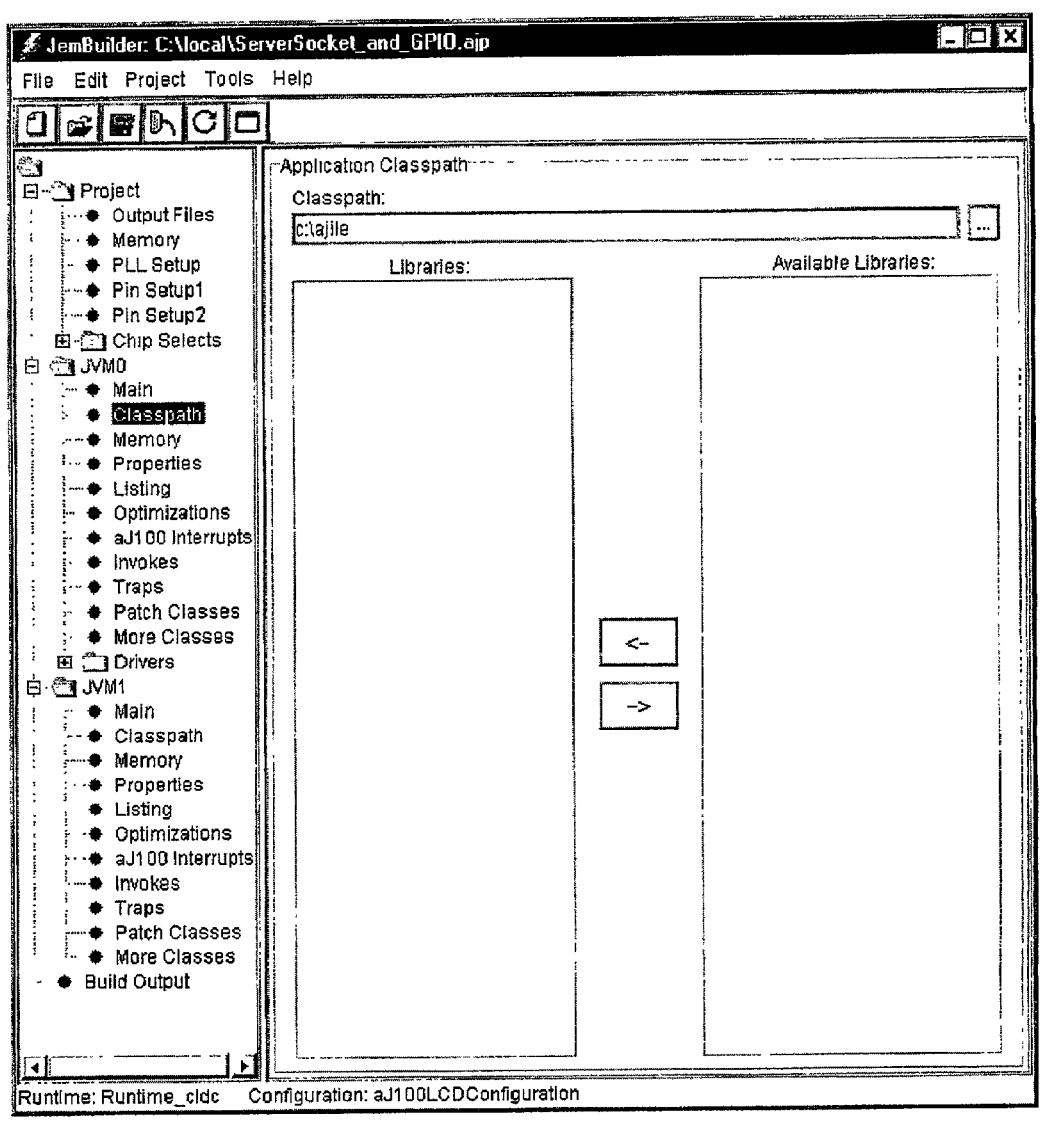
FIG. 19 depicts a screen of a user interface for a builder tool for a multiple virtual machine environment, the screen showing a system overview structure and a variety of classpath parameter fields related to a first virtual machine.

FIG. 19 depicts a screen displaying a variety of classpath parameter fields related to the first virtual machine.

Figure 20:
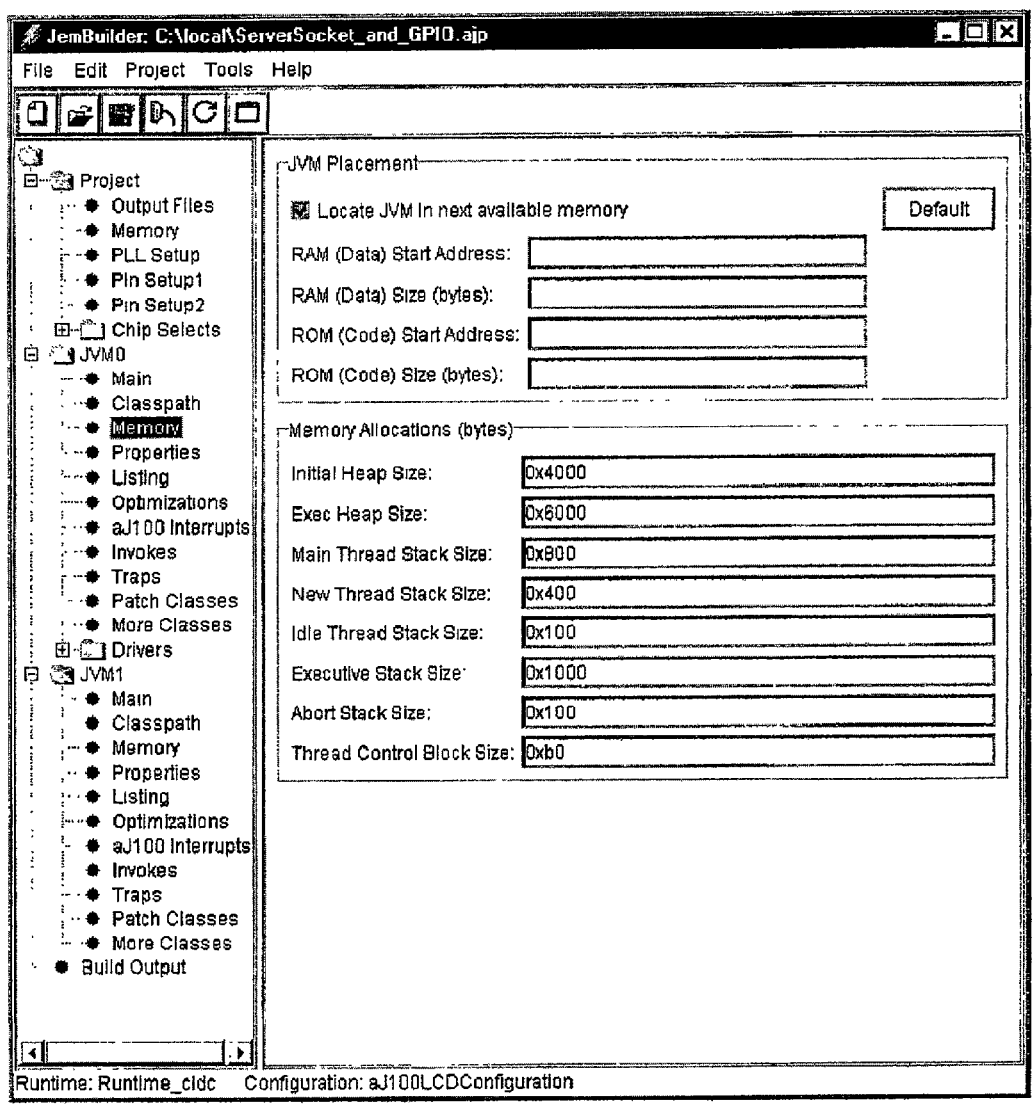
FIG. 20 depicts a screen of a user interface for a builder tool for a multiple virtual machine environment, the screen showing a system overview structure and a variety of memory parameter fields related to a first virtual machine.

FIG. 20 depicts a screen displaying a variety of memory parameter fields related to the first virtual machine.

Figure 21:
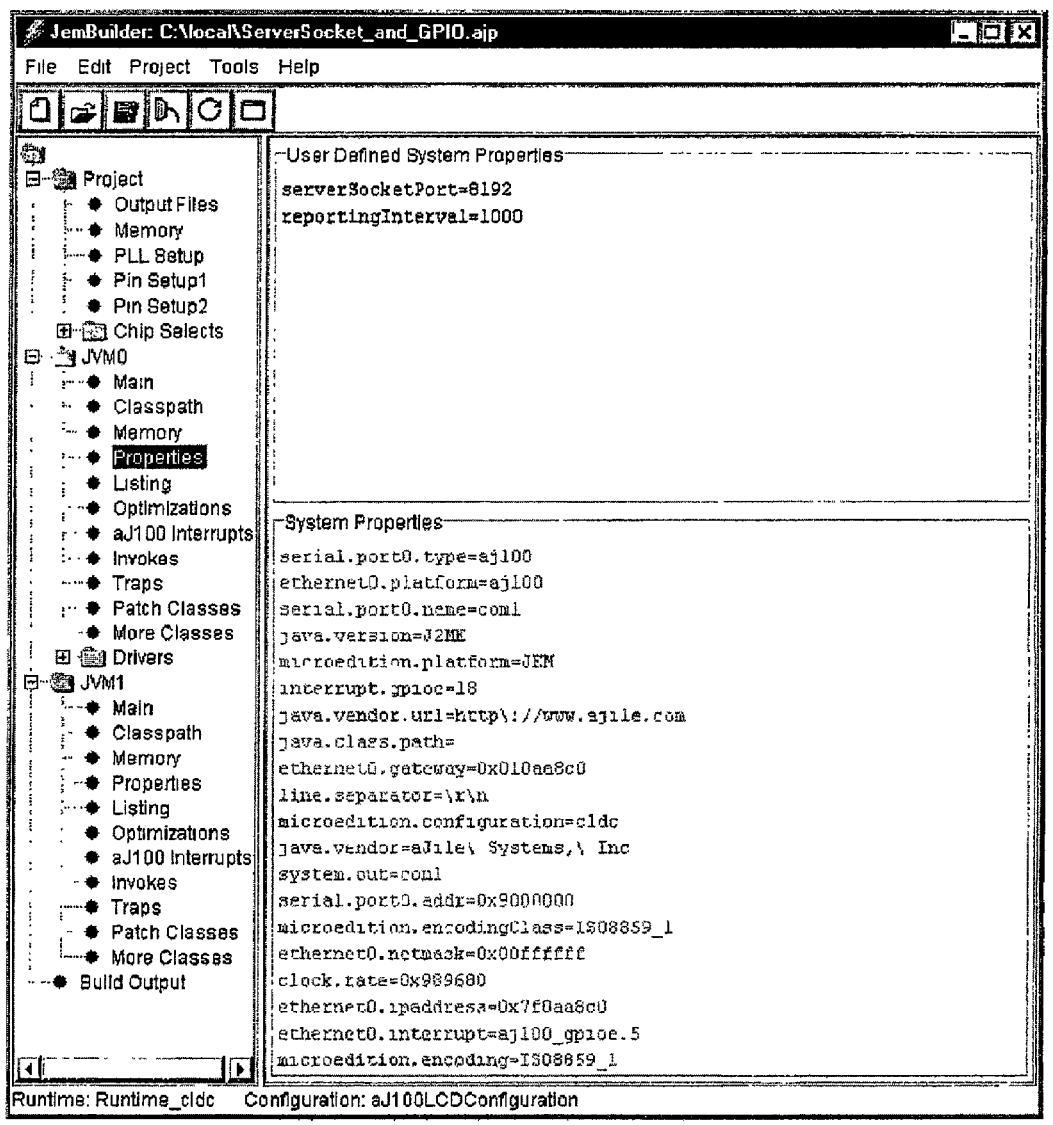
FIG. 21 depicts a screen of a user interface for a builder tool for a multiple virtual machine environment, the screen showing a system overview structure and a variety of system property parameter fields related to a first virtual machine.

FIG. 21 depicts a screen displaying a variety of system property parameter fields related to the first virtual machine.

Figure 22:
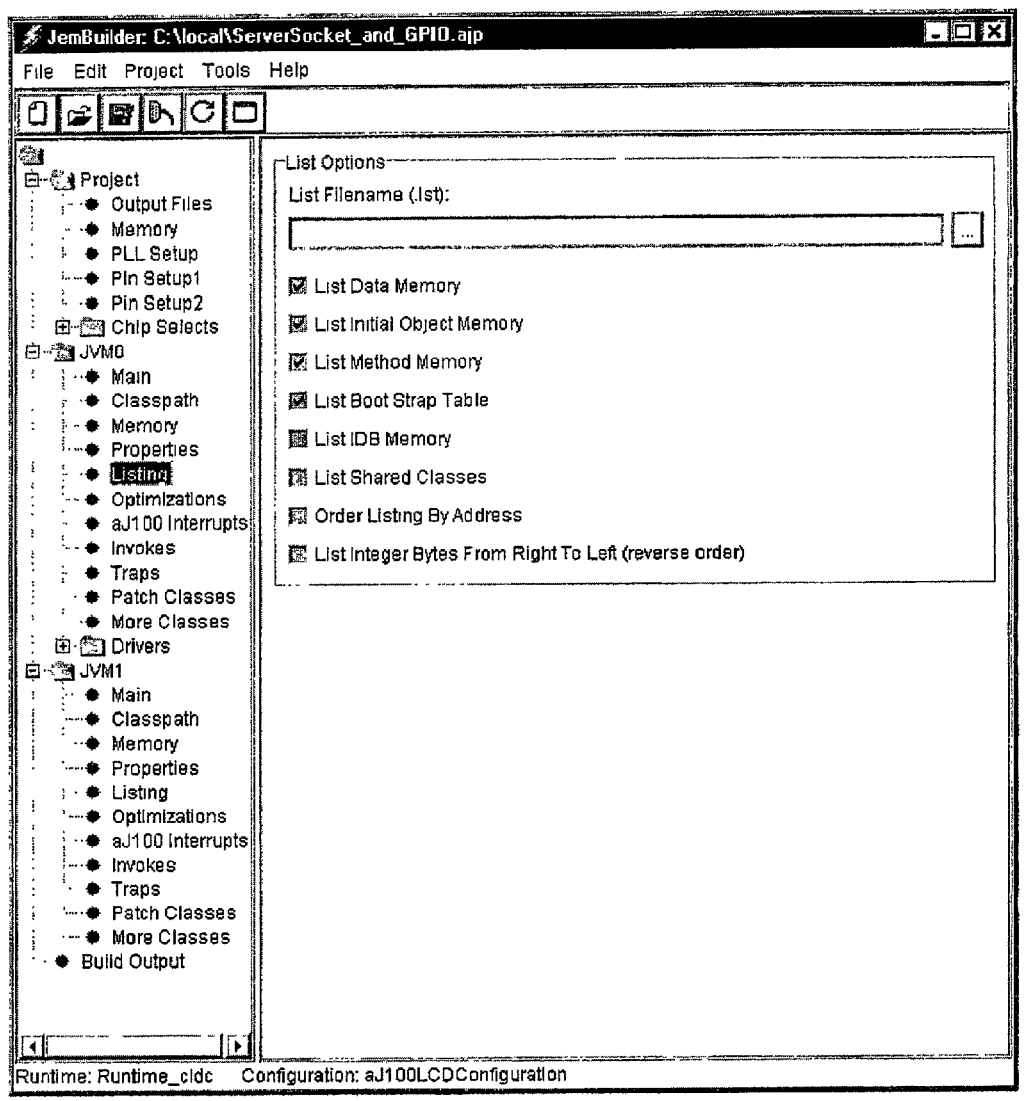
FIG. 22 depicts a screen of a user interface for a builder tool for a multiple virtual machine environment, the screen showing a system overview structure and a variety of listing parameter fields related to a first virtual machine.

FIG. 22 depicts a screen displaying a variety of listing parameter fields related to the first virtual machine.

Figure 23:
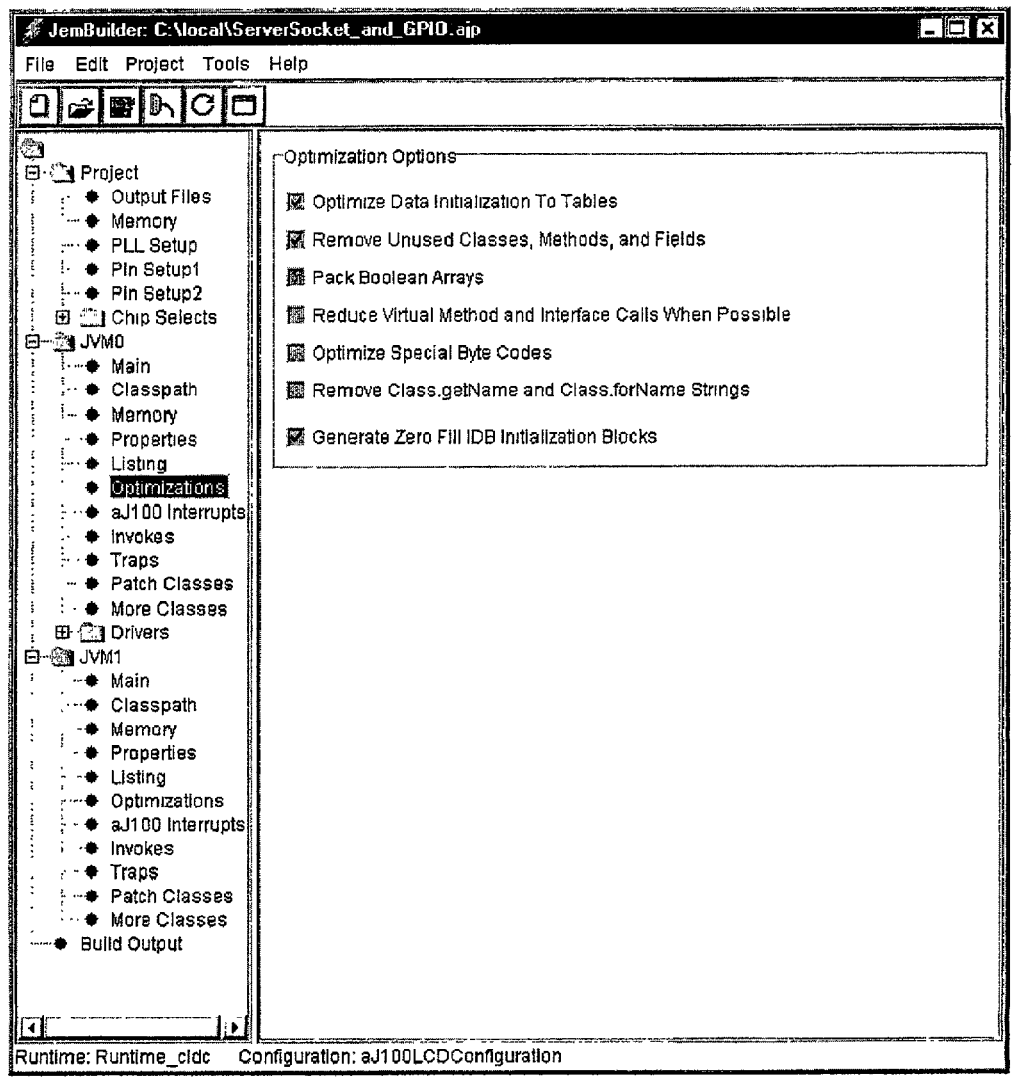
FIG. 23 depicts a screen of a user interface for a builder tool for a multiple virtual machine environment, the screen showing a system overview structure and a variety of optimization parameter fields related to a first virtual machine.

FIG. 23 depicts a screen displaying a variety of optimization parameter fields related to the first virtual machine.

Figure 24:
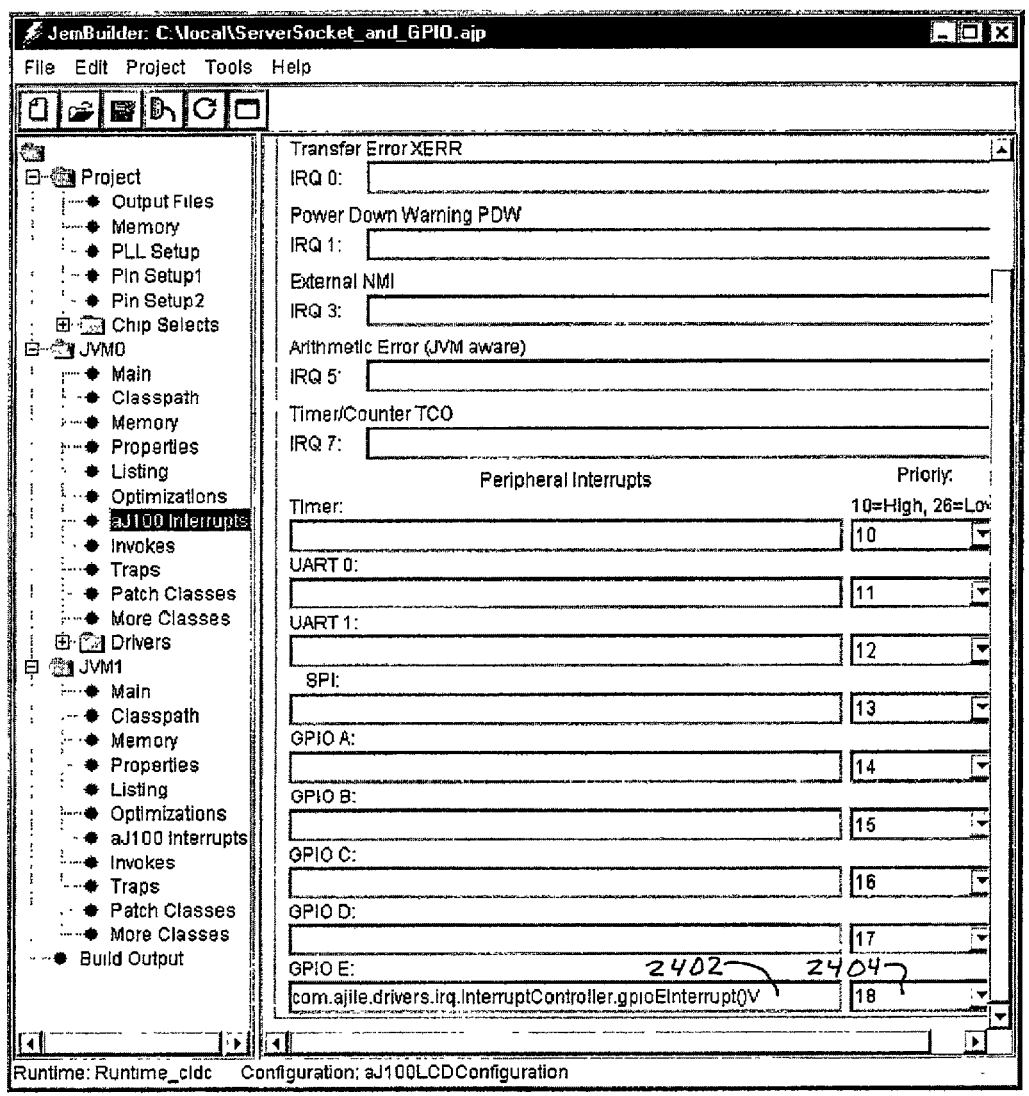
FIG. 24 depicts a screen of a user interface for a builder tool for a multiple virtual machine environment, the screen showing a system overview structure and a variety of interrupt parameter fields related to a first virtual machine.
Figure 25:
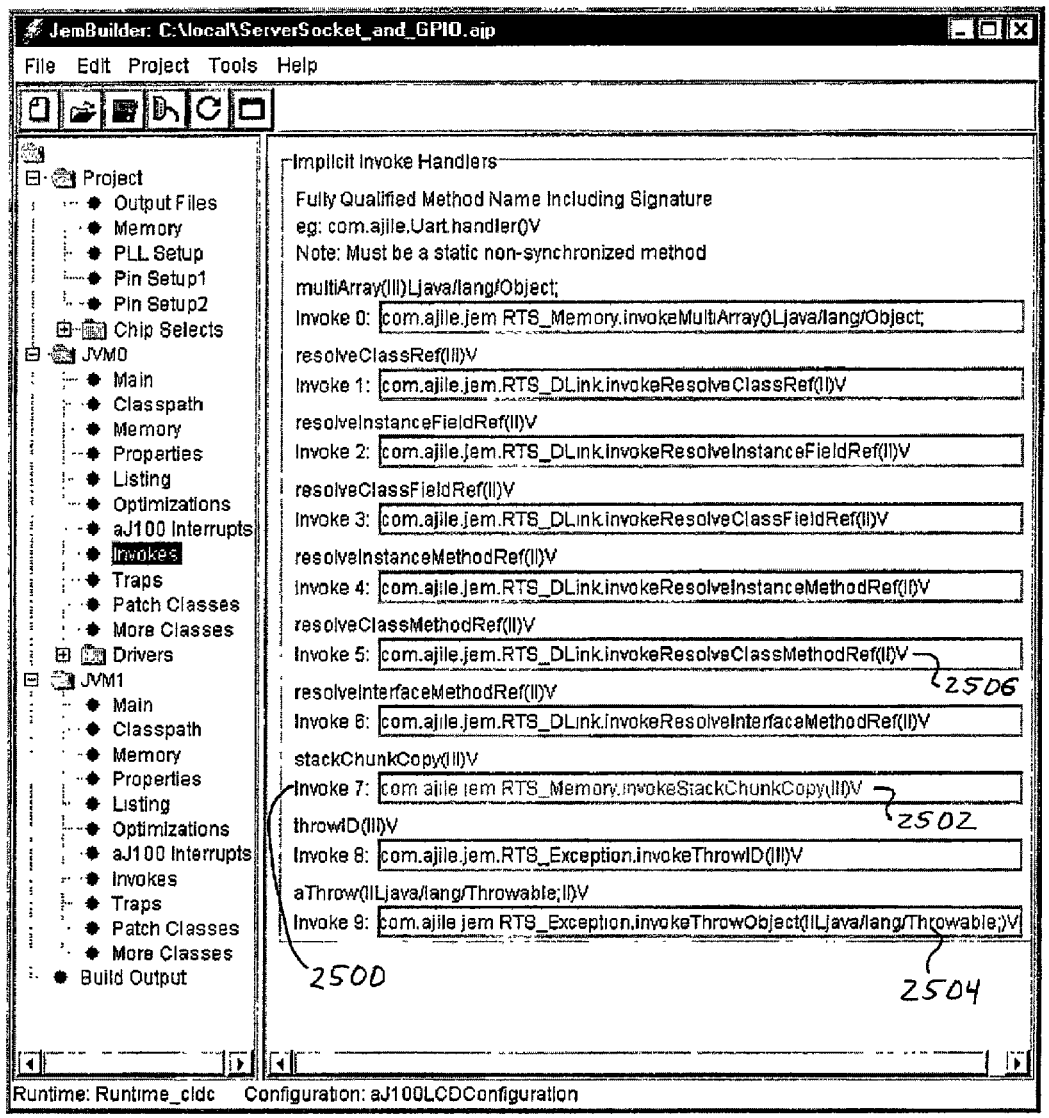
FIG. 25 depicts a screen of a user interface for a builder tool for a multiple virtual machine environment, the screen showing a system overview structure and a variety of invoke parameter fields related to a first virtual machine.
Figure 26:
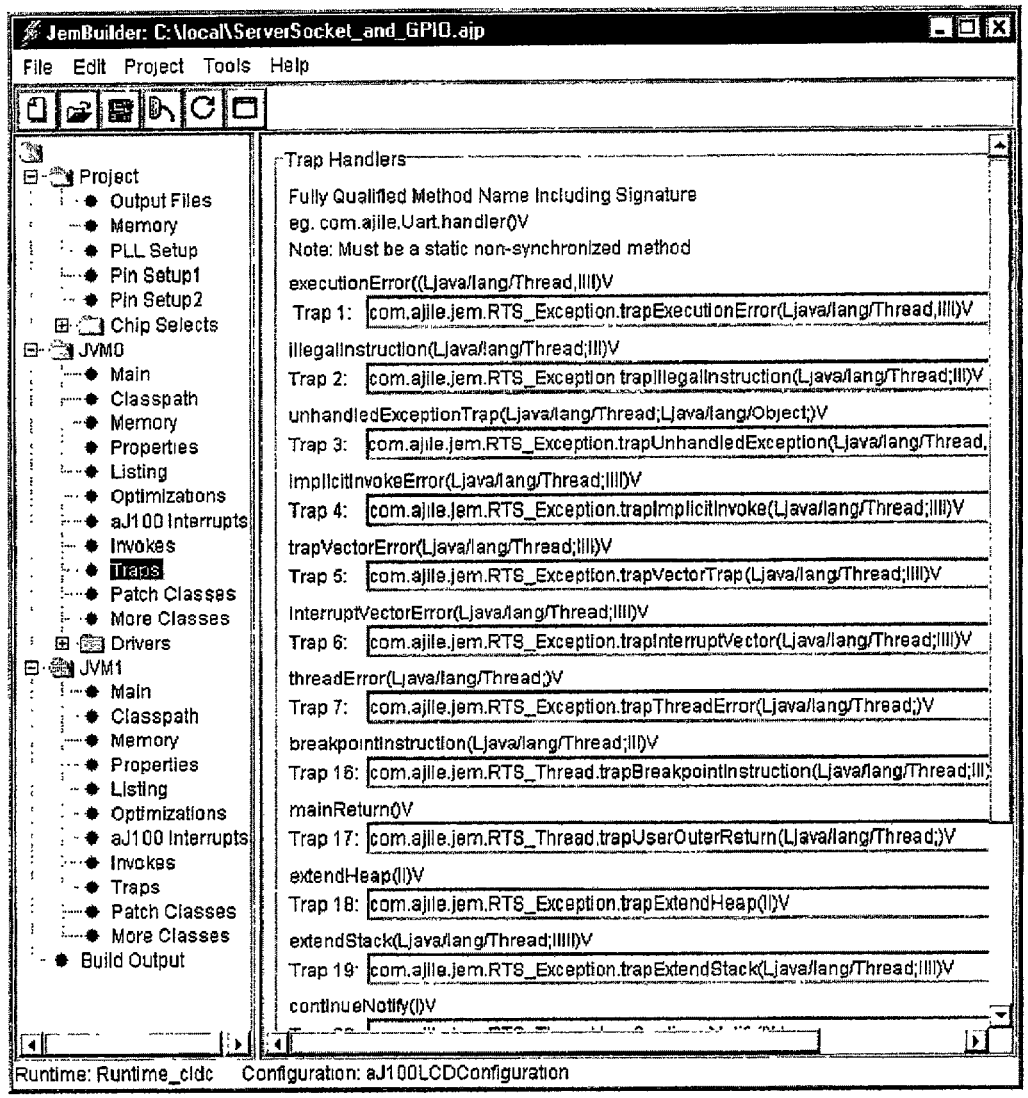
FIG. 26 depicts a screen of a user interface for a builder tool for a multiple virtual machine environment, the screen showing a system overview structure and a variety of trap parameter fields related to a first virtual machine.

FIGS. 24, 25 and 26 depict screens displaying, respectively, a variety of interrupt, invoke and trap parameter fields related to the first virtual machine. Signature methods can be entered into the appropriate parameter field to define each of the various interrupts, invokes and traps. Further, the builder tool manages the system so that conflicts are avoided. For example, the screen 2400 of FIG. 24 enables a user to designate an interrupt by entry of a method signature 2402. The format for JAVA method signatures, such as the method signature appearing in FIG. 24, 2402, can be found in the incorporated JAVA Virtual Machine Specification. The user can also assign a priority level 2404 to each interrupt. The builder tool, however, will not let the user assign the same interrupt priority level to more than one interrupt.

Generally, when an interrupt is assigned to one virtual machine of the system, the builder tool will not let the user also assign that same interrupt to a different virtual machine. The builder tool can display a parameter and indicate that it is unchangeable in a variety of ways. For example, in FIG. 25, "Invoke 7" 2500 and the signature 2502 entered for Invoke 7 2500 is displayed differently than the other signatures (for example 2504, 2506). The signature 2502 can be displayed in a different color. By way of further example, the field in which signature 2500 is displayed can be gray in color and the fields that can be modified for the current virtual machine (here JVM0) can be white or some other color. As a result, the user will be able to view the content of the signature even though he or she will be unable to modify that content within the current context.

Figure 27:
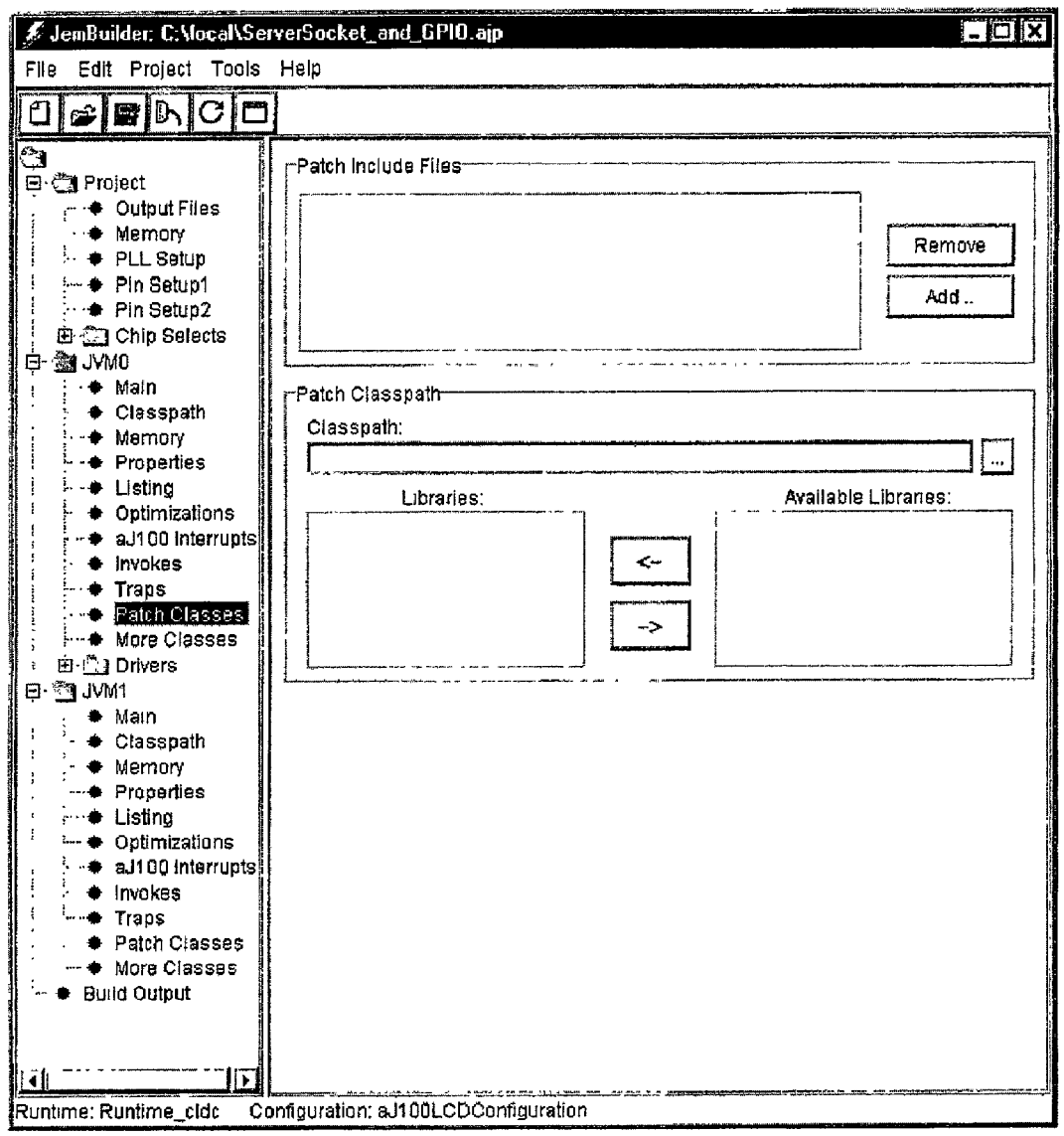
FIG. 27 depicts a screen of a user interface for a builder tool for a multiple virtual machine environment, the screen showing a system overview structure and a variety of patch class parameter fields related to a first virtual machine.
Figure 28:
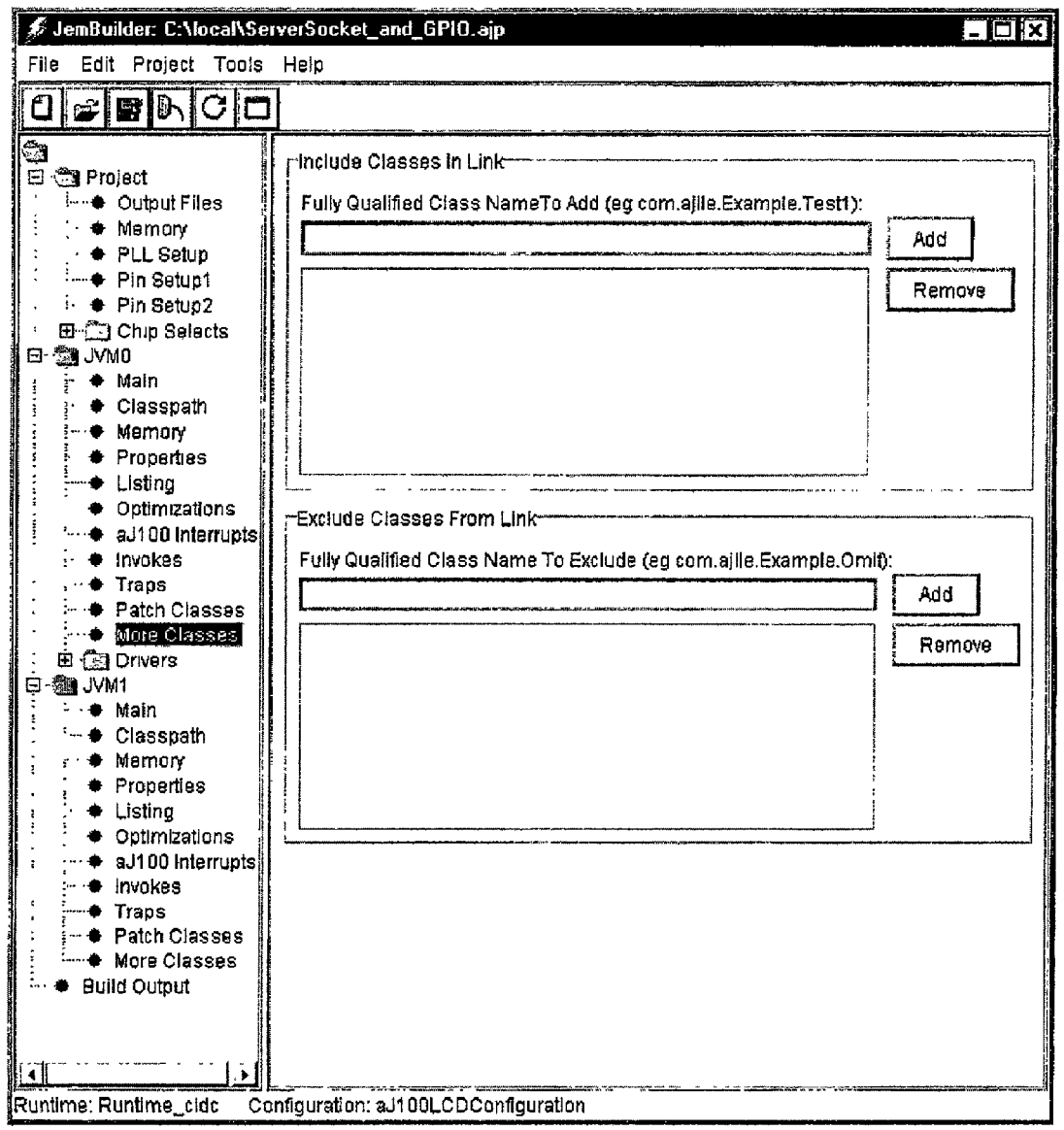
FIG. 28 depicts a screen of a user interface for a builder tool for a multiple virtual machine environment, the screen showing a system overview structure and a variety of additional class parameter fields related to a first virtual machine.

FIGS. 27 and 28 depict screens displaying a variety of patch class parameter fields related to the first virtual machine.

Figure 29:
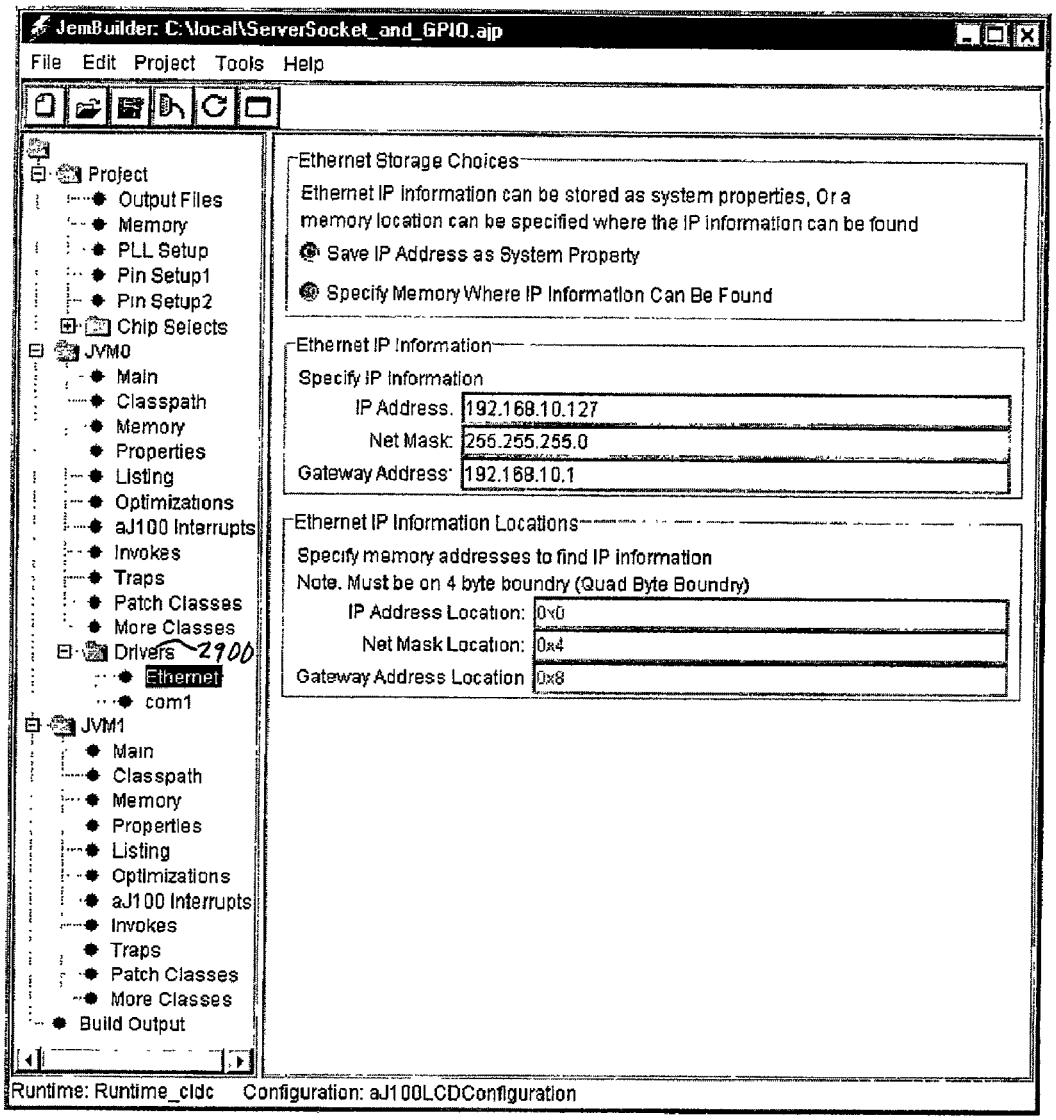
FIG. 29 depicts a screen of a user interface for a builder tool for a multiple virtual machine environment, the screen showing a system overview structure and a variety of Ethernet driver parameter fields related to a first virtual machine.
Figure 30:
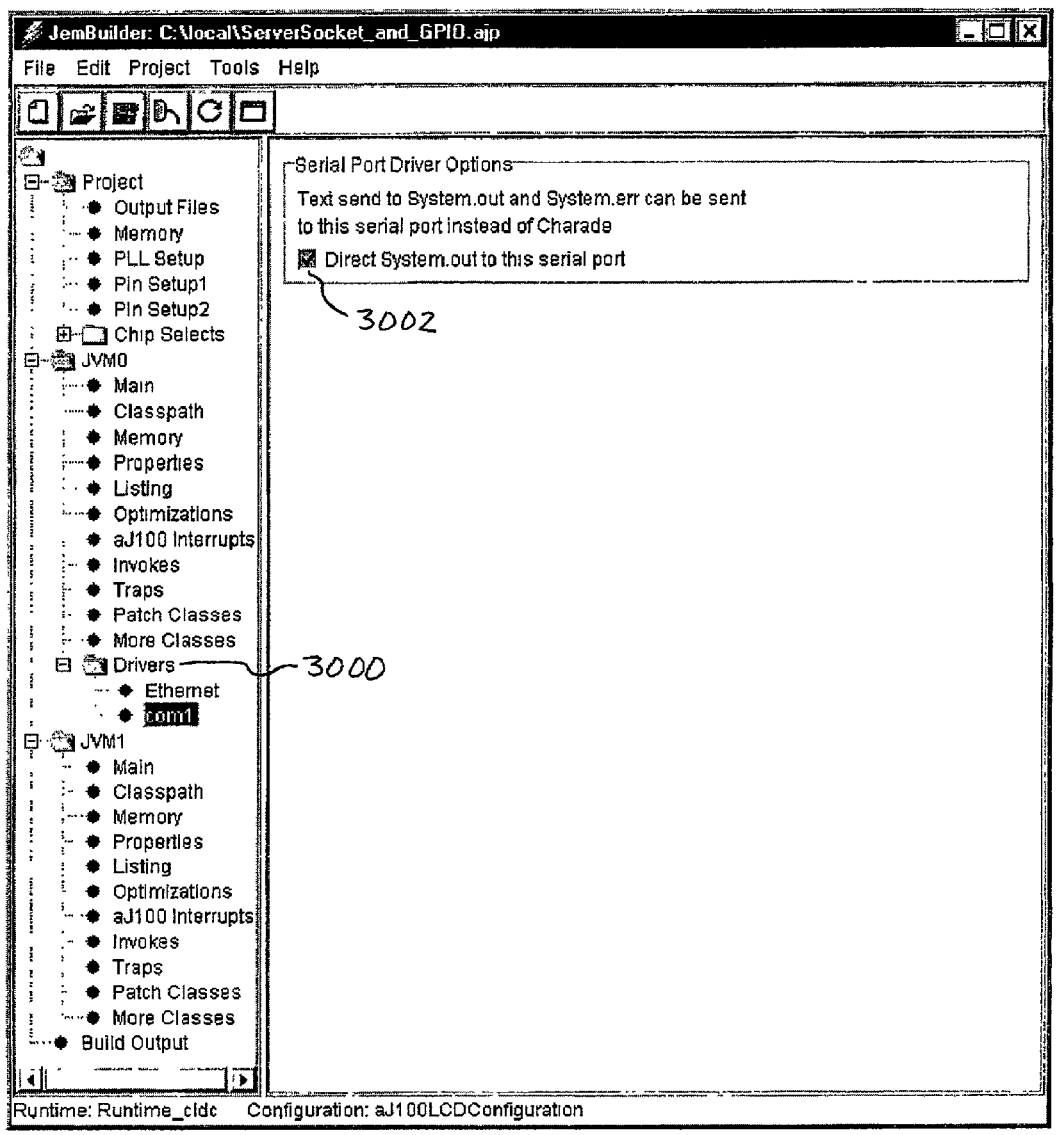
FIG. 30 depicts a screen of a user interface for a builder tool for a multiple virtual machine environment, the screen showing a system overview structure and a variety of serial port driver parameter fields related to a first virtual machine.

FIGS. 29 and 30 depict screens displaying, respectively, a variety of Ethernet driver parameter fields and a variety of serial port driver parameter fields related to the first virtual machine. In the example of FIGS. 29 and 30, a drivers sub-menu 2900, 3000 only appears within the context of one virtual machine (JVM0) and not the other virtual machine (JVM1). This is because the second virtual machine (JVM1) has not yet had any resources assigned to it. In this embodiment, a resources (or driver) sub-menu will only be displayed when resources have been assigned to the particular virtual machine.

FIG. 30 also depicts another feature of the present invention. If desired, "system.out" data can be displayed via a selected one of the virtual machines. This is accomplished by selecting the "direct system.out" parameter field for a virtual machine that has had a serial port installed. Thus, in this example, system.out data for this system will be displayed via the serial port of the first virtual machine (JVM0) during time slices when that virtual machine is active.

Figure 31:
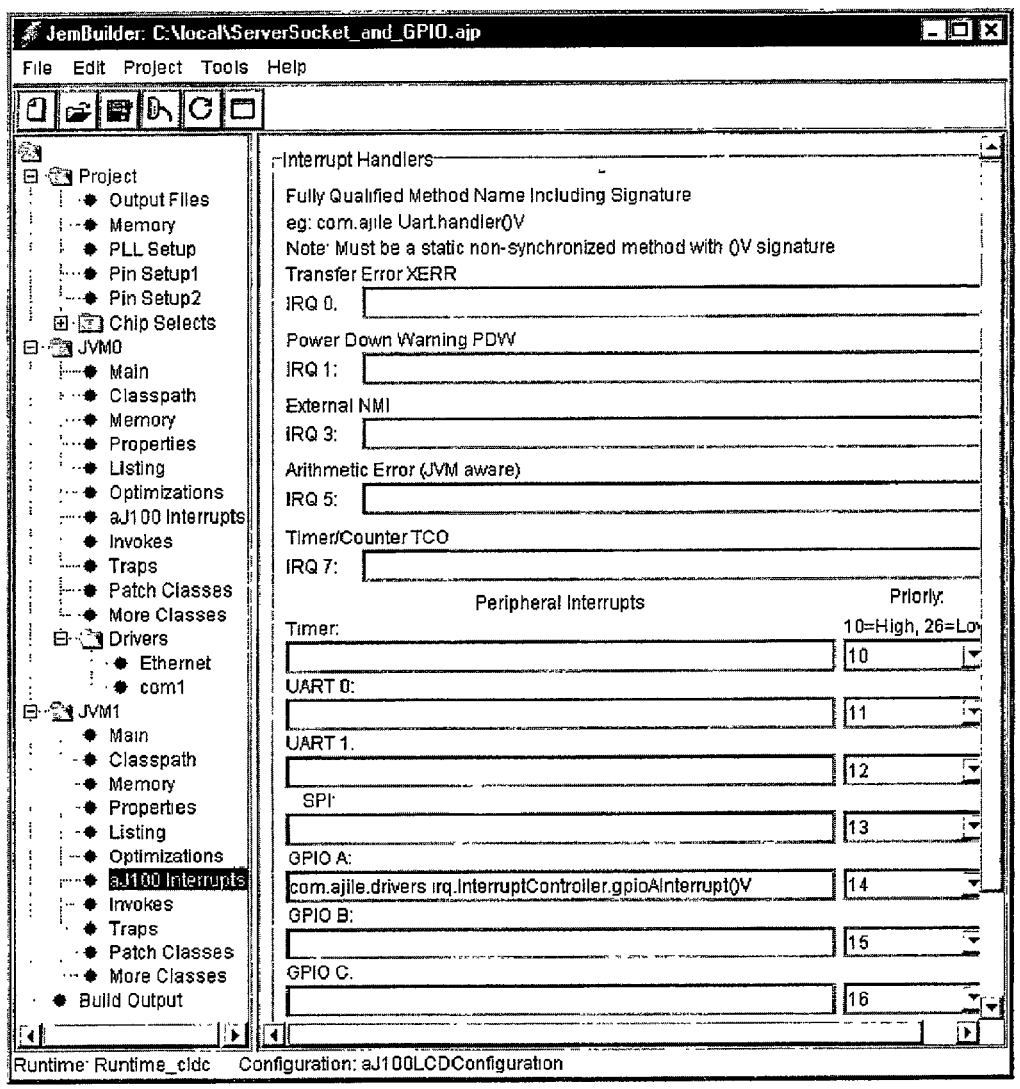
FIG. 31 depicts a screen of a user interface for a builder tool for a multiple virtual machine environment, the screen showing a system overview structure and a variety of interrupt parameter fields related to a second virtual machine of the environment.

FIG. 31 depicts a screen displaying a variety of interrupt parameter fields related to the second virtual machine of the environment. In this embodiment, the fields and text, with the exception of the entered signatures, of this screen are identical to the fields and text displayed in relation to the first virtual machine (JVM0) in FIG. 24. FIG. 24 depicts the lower portion of the scrollable parameter view structure 2406 while FIG. 31 depicts the upper portion of the format of the parameter view structure 3100 (here displayed within the context of the second virtual machine, JVM1). The other parameter groups displayed within the context of the second virtual machine would also be substantially similar in structure (explanatory text and parameter field layout) to their counterparts within the context of the other virtual machines (for example, JVM0).

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely representative embodiments thereof. For example, although some embodiments of the invention and some of the figures refer to JAVA virtual machines, it will be appreciated that the present invention is capable of being used with other types of virtual machines that have been, or will be, developed. Further, it will be appreciated that a variety of different programming languages are available and appropriate for creating the code for the various embodiments.

The invention claimed is:

1. A computer-implemented builder tool to create a target executable file for a multiple virtual machine environment, comprising:

a computerized system comprising a graphical user interface;

an overview component, presented on said graphical user interface, depicting a plurality of virtual machine of an embedded virtual machines environment having concurrently-running virtual machines; and a parameter detail component, presented on said graphical user interface concurrently with display, in said overview component, of its related virtual machine of said plurality of virtual machines of an embedded virtual machine environment;

wherein said parameter detail component displays parameter information associated with at least one of the virtual machines of said overview component, and wherein the builder tool builds multiple applications into an executable image to run in a multiple virtual machine environment having concurrently-running virtual machines.

2. The computer-implemented builder tool of claim 1, wherein said overview component further comprises a project choice.

3. The computer-implemented builder tool of claim 2, wherein said project choice further comprises a plurality of choices.

4. The computer-implemented builder tool of claim 1, wherein each virtual machine of said plurality of virtual machines further comprises a plurality of associated virtual machine parameter group designators.

5. The computer-implemented builder tool of claim 4, wherein said overview component comprises a tree structure facilitating parameter group designator selection.

6. The computer-implemented builder tool of claim 4, wherein said overview component comprises an index tab structure facilitating parameter group designator selection.

7. The computer-implemented builder tool of claim 4, wherein said overview component comprises a main menu and sub-menu structure facilitating parameter group designator selection.

8. The computer-implemented builder tool of claim 1, wherein at least one virtual machine of said plurality of virtual machines comprises an interrupt assignment parameter group designator.

9. The computer-implemented builder tool of claim 1, wherein each virtual machine of said plurality of virtual machines comprises an interrupt assignment parameter group designator.

10. The computer-implemented builder tool of claim 8, wherein said parameter detail component comprises a method signature entry field when said interrupt assignment parameter group designator is selected.

11. The computer-implemented builder tool of claim 1, further comprising a new virtual machine creator.

12. The computer-implemented builder tool of claim 11, wherein said new virtual machine creator comprises a routine prompting a user to enter data needed to create a new virtual machine.

13. The computer-implemented builder tool of claim 12, wherein said routine also automatically retrieves data needed to create a new virtual machine.

14. The computer-implemented builder tool of claim 1, further comprising a resource manager.

15. The computer-implemented builder tool of claim 14, wherein said resource manager further comprises a resource determination algorithm.

16. The computer-implemented builder tool of claim 15, wherein said resource manager further comprises a resource modification interface.

17. The computer-implemented builder tool of claim 16, wherein said resource modification interface comprises a resource allocation interface.

18. The computer-implemented builder tool of claim 16, wherein said resource modification interface comprises a resource removal interface.

19. The computer-implemented builder tool of claim 1, further comprising a parameter determination algorithm.

20. The computer-implemented builder tool of claim 19, wherein said parameter determination algorithm comprises a parameter prioritization structure.

21. A computer-readable storage medium, comprising a computer-executable code to establish a builder tool for an embedded multiple independent virtual machine environment, wherein the builder tool builds multiple application into an executable image to run in a multiple virtual machine environment having concurrently-running virtual machines, said code comprising an algorithm to determine build parameters, said algorithm to determine build parameters being structured to perform a prioritized search based on how the parameter was defined; said code further comprising an algorithm to determine available resources, said algorithm to determine available resources being structured to permit user allocation of an available resource; said code further comprising an algorithm to dynamically update available resource data throughout the builder tool, in real time, upon determining the available resources; said code further comprising an algorithm to dynamically update available build parameter data throughout the builder tool, in real time, upon determination of build parameters; and said code further comprising a routine to permit user configuration of hardware pins via a graphical user interface.

22. A computer-implemented builder tool to create a target executable file for a multiple virtual machine environment, comprising:

means for executing computer code; and means for displaying a visual user interface, coupled with said means for executing computer code, said means for displaying comprising a visible overview component depicting a plurality of virtual machines of an embedded multiple virtual machine environment having concurrently-running virtual machines and a visible parameter detail component related to a depicted virtual machine of said plurality of virtual machines;

wherein the builder tool builds multiple applications into an executable image to run in an environment of concurrently-running multiple virtual machines.

* * * * *